United States Patent
Berlin et al.

(10) Patent No.: US 10,194,299 B2
(45) Date of Patent: Jan. 29, 2019

(54) MULTIPLE APPLICATION MODULE OR UNIT

(71) Applicant: Corning Optical Communications LLC, Hickory, NC (US)

(72) Inventors: Igor Berlin, Potomac, MD (US); Aravind Chamarti, Ashburn, VA (US); Yuval Zinger, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/641,523

(22) Filed: Jul. 5, 2017

(65) Prior Publication Data

US 2017/0302340 A1    Oct. 19, 2017

Related U.S. Application Data

(63) Continuation of application No. PCT/US2016/012676, filed on Jan. 8, 2016.
(Continued)

(51) Int. Cl.
*H04W 4/00* (2018.01)
*H04W 4/80* (2018.01)
(Continued)

(52) U.S. Cl.
CPC ............. *H04W 4/80* (2018.02); *H04B 7/04* (2013.01); *H04L 67/10* (2013.01); *H04W 4/02* (2013.01)

(58) Field of Classification Search
CPC . H04W 4/02; H04W 4/80; H04B 7/04; H04L 67/10
See application file for complete search history.

(56) References Cited

U.S. PATENT DOCUMENTS 6,757,270 B1 * 6/2004 Kumar .................. H04W 52/12
370/342
7,089,014 B2   8/2006 Brown et al.
(Continued)

FOREIGN PATENT DOCUMENTS

EP          1699249 A1     9/2006
EP          2081334 A1     1/2008
(Continued)

OTHER PUBLICATIONS

Patent Cooperation Treaty, PCT/US2016/012676, invitation to Pay Additional Fees, dated May 3, 2016, 6 pages.

*Primary Examiner* — Dominic E Rego
(74) *Attorney, Agent, or Firm* — C. Keith Montgomery

(57) ABSTRACT

A wireless distribution system (WDS) is configured for transmitting a downlink signal or for receiving an uplink signal. A computing device configured to serve as a client device to the WDS includes a memory; a multiple applications processor in communication with the memory and configured to execute one or more mobile applications; and a wireless service processor in communication with the multi applications processor for communicating via a corresponding wireless service with the WDS. The multi applications processor is configured to execute an instance of a data service to establish a connection with the WDS for a specified application process utilizing the wireless service to provide at least one datum on the WDS. In the method, an instance of a data service is executed to establish a connection with a WDS for a specified application process utilizing a wireless service to provide at least one datum on the WDS.

9 Claims, 18 Drawing Sheets

Related U.S. Application Data

(60) Provisional application No. 62/171,442, filed on Jun. 5, 2015, provisional application No. 62/142,021, filed on Apr. 2, 2015, provisional application No. 62/101,427, filed on Jan. 9, 2015.

(51) Int. Cl.
*H04B 7/04* (2017.01)
*H04W 4/02* (2018.01)
*H04L 29/08* (2006.01)

(56) References Cited

U.S. PATENT DOCUMENTS

| | | | |
|---|---|---|---|
| 7,606,594 B2 | 10/2009 | Jesse et al. | |
| 8,326,313 B2 | 12/2012 | McHenry et al. | |
| 2004/0203833 A1* | 10/2004 | Rathunde | H04W 4/16 455/453 |
| 2004/0225740 A1 | 11/2004 | Klemba et al. | |
| 2007/0206553 A1* | 9/2007 | Khushu | H04L 29/12264 370/338 |
| 2008/0070619 A1 | 3/2008 | Yu | |
| 2008/0107014 A1* | 5/2008 | Huang | H04W 28/16 370/216 |
| 2008/0117961 A1* | 5/2008 | Han | H04B 7/043 375/227 |
| 2008/0182611 A1* | 7/2008 | Han | H04W 52/20 455/522 |
| 2008/0291985 A1 | 11/2008 | Adnani et al. | |
| 2010/0097952 A1 | 4/2010 | McHenry et al. | |
| 2010/0105332 A1 | 4/2010 | McHenry et al. | |
| 2010/0173586 A1 | 7/2010 | McHenry et al. | |
| 2011/0059741 A1 | 3/2011 | Klein | |
| 2011/0170424 A1 | 7/2011 | Safavi | |
| 2011/0208968 A1 | 8/2011 | Inada | |
| 2011/0277001 A1 | 11/2011 | Kaluskar et al. | |
| 2012/0134328 A1 | 5/2012 | Gauvreau et al. | |
| 2012/0327800 A1 | 12/2012 | Kim et al. | |
| 2013/0017792 A1 | 1/2013 | Miller, II | |
| 2013/0150063 A1 | 6/2013 | Berlin et al. | |
| 2014/0146692 A1 | 5/2014 | Hazani et al. | |
| 2014/0233442 A1 | 8/2014 | Atias et al. | |
| 2014/0281472 A1* | 9/2014 | Yalamanchili | G06F 15/7871 713/100 |
| 2016/0302116 A1 | 10/2016 | Chamarti et al. | |
| 2016/0352393 A1 | 12/2016 | Berlin et al. | |
| 2017/0041810 A1 | 2/2017 | Chamarti | |

FOREIGN PATENT DOCUMENTS

| | | |
|---|---|---|
| EP | 2767413 A2 | 8/2014 |
| EP | 2696617 A1 | 12/2014 |
| WO | 2006052759 A2 | 5/2006 |
| WO | 2010022156 A2 | 2/2010 |
| WO | 2012134538 A1 | 10/2012 |
| WO | 2012173570 A1 | 12/2012 |
| WO | 2013028119 A1 | 2/2013 |
| WO | 2013050586 A2 | 4/2013 |
| WO | 2013096563 A1 | 6/2013 |
| WO | 2015183791 A1 | 12/2015 |
| WO | 2016112308 A2 | 7/2016 |

\* cited by examiner

MULTIPLE APPLICATION MODULE OR UNIT

CROSS-REFERENCED APPLICATION

This application is a continuation of International Application No. PCT/US16/12676 filed on Jan. 8, 2016, which claims priority to U.S. Provisional Patent Application No. 62/101,427, filed on Jan. 9, 2015, Application No. 62/142,021, filed Apr. 2, 2015, and Application No. 62/171,442, filed on Jun. 5, 2015, all of which are relied upon and incorporated herein by reference in their entireties.

BACKGROUND

The technology of this disclosure relates generally to reliability of a wireless distribution system (WDS), and more particularly to techniques for enhancing quality of service (QoS) and metrics of communication signals which may be used in a wireless distribution system.

Wireless communication is rapidly growing, with ever-increasing demands for high-speed mobile data communication. As an example, local area wireless services (e.g., so-called "wireless fidelity" or "Wi-Fi" systems) and wide area wireless services are being deployed in many different types of areas, e.g., coffee shops, airports, libraries, and the like. Wireless distribution systems (WDSs) communicate with wireless devices called "clients," "client devices," "wireless client devices," or "wired client devices," which reside within the wireless range or "cell coverage area" in order to communicate with an access point device. More generally, a client is computer hardware or software that accesses a service made available by a server. One example of a wireless distribution system is a distributed antenna system (DAS). DASs are particularly useful for deployment inside buildings or other indoor environments where client devices may not otherwise be able to effectively receive radio-frequency (RF) signals from a source, such as a base station, for example. Exemplary applications where distributed antenna systems can be used to provide or enhance coverage for wireless services include public safety, cellular telephony, local access network (LANs), wireless local access networks (wireless LANs), distributed antenna systems (DAS), location tracking, and medical telemetry inside buildings and over campuses.

Wireless communications services are expanding rapidly into an ever-wider array of communications media. Wi-Fi or wireless fidelity systems, for example, are now commonplace, used in a variety of commercial and public settings, such as homes, offices, shops, malls, libraries, airports, and the like. Distributed antenna systems are commonly used to improve coverage and communication of cellular and Wi-Fi communication systems. Distributed antenna systems typically include a plurality of spatially separated antennas. The distributed antennas systems communicate with a variety of such commercial communications systems to distribute their services to clients within range of the distributed antenna system.

These antenna systems provide efficient distribution of communications services to clients, or a set of client devices, in a desired area of a location, such as a building, an array of buildings or an even larger service area, such as an airport, an outdoor park or a stadium. Within the client area, distribution of the services may be provided by an internal distribution network that is a part of the distributed antenna system. The network may include optical fibers and conventional wired cables for distributing a variety of communications services.

What is needed is a better way to improve Quality of Service (QoS) and QoS metrics in wireless and wired distribution systems.

SUMMARY

Technologies are described for using the capabilities of devices and applications in user equipment and like equipment to establish a connection with a network for a specified application process utilizing a wireless service, a wired service, or both a wireless service and a wired service, to provide at least one datum on the network.

One embodiment of the disclosure relates to a client device provided for use in a wireless distribution system (WDS). The client device comprises a computing device configured to serve as a client device to a wireless distribution system (WDS). The computing device comprises a memory. The computing device comprises a multi applications processor configured for communication with the memory. The multi applications processor is also configured to execute one or more mobile applications. The computing device also comprises a wireless service processor configured for communication with the multi applications processor. The wireless service processor is also configured to communicate via a corresponding wireless service with the WDS. The multi applications processor is further configured to execute an instance of a data service. The data service is configured to establish a connection with the WDS for a specified application process utilizing the wireless service to provide at least one datum on the WDS.

An additional embodiment of the disclosure relates to a communication system. The communication system comprises a WDS configured for transmitting a downlink signal or for receiving an uplink signal. The communication system also comprises a computing device configured to serve as a client device to the WDS. The computing device comprises a memory. The computing device also comprises a multiple (multi) applications processor in communication with the memory. The multi applications processor is also configured to execute one or more mobile applications. The computing device also comprises a wireless service processor in communication with the multi applications processor for communicating via a corresponding wireless service with the WDS. The multi applications processor is configured to execute an instance of a data service to establish a connection with the WDS for a specified application process utilizing the wireless service to provide at least one datum on the WDS.

An additional embodiment of the disclosure relates to a method for communicating with a network comprising the steps of: calling a client; establishing a communication link with a data service of a client device; providing a specified application process number to the data service; and requesting the data service to establish connection with the network for the specified application process number.

An additional embodiment of the disclosure relates to a method of communicating. The method comprises transmitting a downlink signal or receiving an uplink signal in a WDS. The method also comprises communicating via a wireless service with the WDS. The method also comprises executing a data service utilizing the wireless service that provides the WDS with at least one datum on the transmitted downlink signal or the received uplink signal of the WDS. The method also comprises communicating the at least one datum to the WDS.

Technologies are also described for providing a network optimization device. Using this technology, as an example, as a stationary multiple application module or a mobile multiple application unit, its GPS locating capability enables carrier correlation with user location. Thus, user equipment performance to a remote wireless distribution system can be quantified. It is also possible to adjust the performance of the wireless distribution system using industry standards that apply to user equipment, such as smart phones. These adjustments may use industry-standard communication protocols and industry-standard communication interfaces. By enabling access to different communication media supported by the multiple application module, a carrier or provider can utilize built-in redundancy to control the wireless distribution system and the downstream distributed antenna system (DAS).

An additional embodiment of the disclosure relates to a multiple application user device. The multiple application user device includes a user equipment comprising a multiple applications processor, a wireless service processor, a memory, a peripheral interface port, and a sensor. Each of the multiple applications processor, the wireless service processor, the peripheral interface port, and the sensor communicate data over a communication interface. The multiple applications processor is configured to execute an instance of a data service. The data service is configured to establish: a first interface configured to filter data that is sent and received wirelessly across the communication interface from a client device in a WDS to selectively acquire user equipment data based on the filtered data, and a second interface configured to allow remote access to the selected user equipment data from the client device in the WDS.

Another embodiment of the disclosure relates to a communication system. The communication system comprises a WDS configured for transmitting a downlink signal or for receiving an uplink signal. The communication system also comprises a multiple application user device including a multiple applications processor, a wireless service processor, a memory, a peripheral interface port, and a sensor. Each of the multiple applications processor, the wireless service processor, the peripheral interface port, and the sensor communicate data over a communication interface. The multiple applications processor is configured to execute an instance of a data service. The data service is configured to establish: a first interface configured to filter data that is sent and received across the communication interface from a client device in a WDS to selectively acquire user equipment data based on the filtered data, and a second interface configured to allow remote access to the selected user equipment data from the client device in the WDS.

In another embodiment a method for optimizing a WDS includes the steps of: filtering data that is sent and received across a communication interface of a user equipment from a client device in the WDS to selectively acquire user equipment data based on the filter data, and remotely accessing the selected user equipment performance data from the client device in the WDS.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
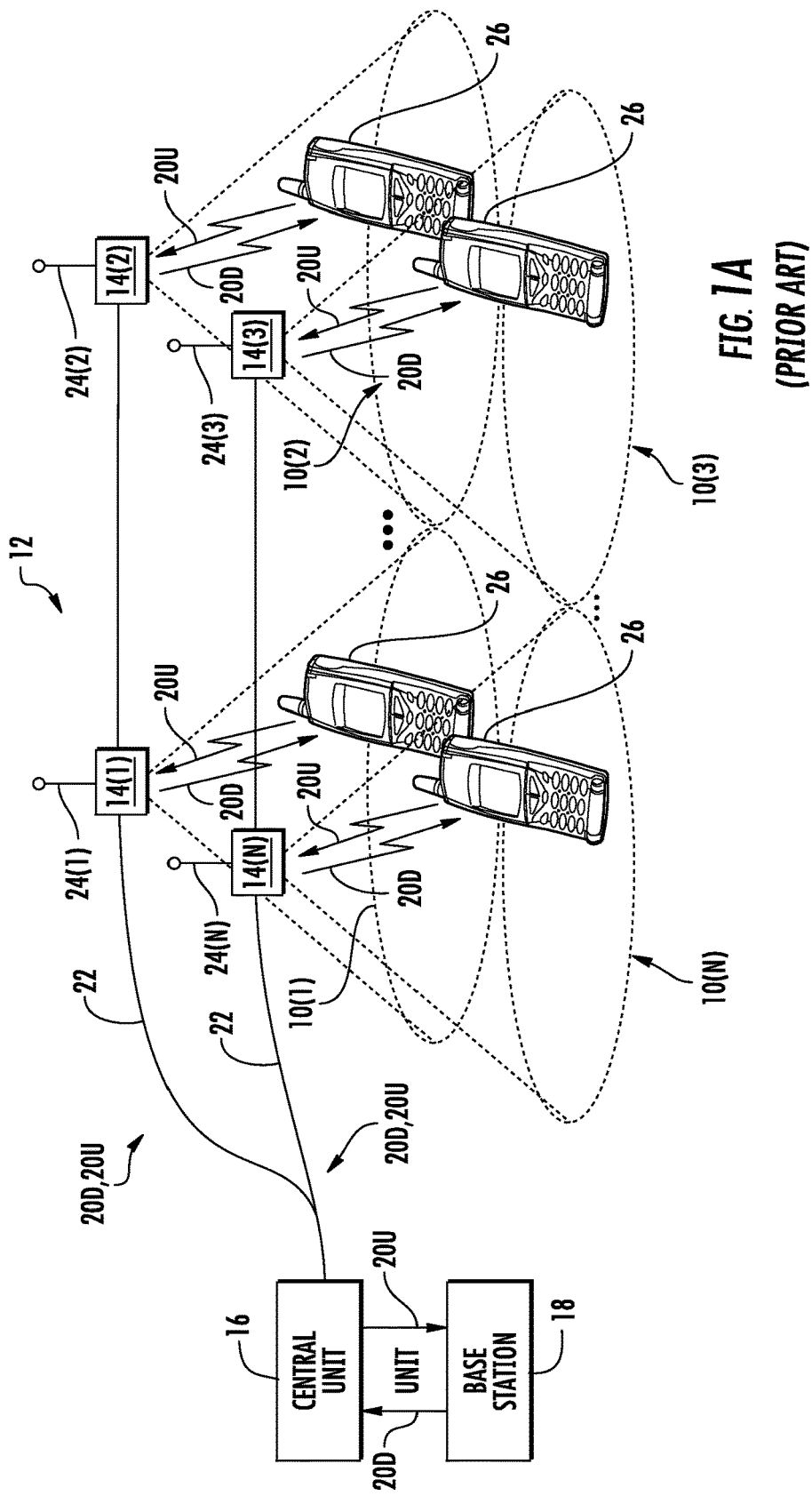
FIG. 1A is a distributed antenna system for mobile user equipment of the prior art.

Various embodiments will be further clarified by the following examples.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Briefly stated, technologies are generally described for a computing device configured to serve as a client device to a wireless distribution system (WDS) including a memory; a multiple applications processor in communication with the memory and configured to execute one or more mobile applications; and a wireless service processor in communication with the multi applications processor for communicating via a corresponding wireless service with the wireless distribution system (WDS). The multi applications processor is configured to execute an instance of a data service to establish a connection with the wireless distribution system (WDS) for a specified application process utilizing the wireless service to provide at least one datum on the wireless distribution system (WDS). In the method, an instance of a data service is executed to establish a connection with a wireless distribution system (WDS) for a specified application process utilizing a wireless service to provide at least one datum on the wireless distribution system (WDS).

In describing more fully this disclosure, we make reference to the following definitions.

By the term "communication service" is meant digital data services including but not limited to Wi-Fi, Bluetooth®, ZigBee®, Ethernet, DSL, LTE, Wireless Access Points (WAPs), PCS, 2G, 3G, 4G, DSL (Digital Subscriber Line), Long Term Evolution (LTE), Remote Radio Heads (RRH), Radio over Fiber Optic Cable (RoF), OCS band, WiMax (Worldwide Interoperability for Microwave Access), LAN, CDMA, TDMA, GSM, WDM and WLAN.

By the term "distributed antenna system" or DAS is meant an antenna system that includes a plurality of spatially separated antennas. The DAS may communicate with a variety of commercial communications systems to distribute the services to clients within range of the distributed antenna system. The distributed antenna system may be an optical fiber-based distributed antenna system, but such is not required, and these systems may include both optical fibers and standard wired communications cables, such as those with copper conductors. It will be appreciated that the distributed antenna system may be a wire-based or a wireless system.

By the term "head end unit (HEU)" is meant a plurality of RDCs and a switching matrix for combining a plurality of communications signals into a broad band signal for further transmission, such as to an optical input unit, and for splitting a broadband signal from an optical input unit into individual communication signals, thus allowing two-way communications.

By the term "optical input unit (OIU)" is meant a plurality of RDCs and a switching matrix for transmitting a broadband electrical signal from a head end unit to a destination, such as to a plurality of optical input modules. The optical input unit also receives a plurality of broadband electrical signals from the plurality of optical input modules and transmits them in the opposite direction, such as to the head end unit, thus allowing for two-way communications.

By the term "radio distribution/combiner (RDC) is meant a device that combines narrowband signals into broadband signals and splits broadband signals into narrowband signals. The signals are illustratively electrical signals but may be an optical or other signal. The RDCs may be RDC cards, e.g., circuit boards with the appropriate combining and splitting functionality well known in the art By the term "optical input module" is meant a device that converts broadband electrical signals into broadband optical signals and vice versa.

By the term "remote antenna unit (RAU)" or remote unit ("RU") is meant a device connected to an optical input module that converts and filters a broadband optical signal into a narrow electrical signal and vice versa.

By the term "narrowband communication signals" is meant a specific band of frequencies of operation of a communication service that a provider is permitted to transmit under communication guidelines and permissions.

By the term "broadband communication signals" is meant a band of communication signals that is made up of two or more narrow bands of communication signals.

By the term "clients or recipients of these services" is meant devices such as cellular phones, smart phones, wireless computers, wireless lap-top computers, mobile devices such as tablet computers, pad computers, personal digital assistant, and wireless sensors or networks of sensors, such as mesh network sensors. These examples are not intended to be limiting, and the present disclosure is not limited to these examples of client devices. More generally, a client is computer hardware or software that accesses a service made available by a server.

By the term "GPU" is meant a graphic processing unit.

By the term "GPIO" is meant general purpose I/O.

By the term "Uart" is meant universal asynchronous receiver/transmitter.

By the term "DMA" is meant direct memory access.

By the term "Physical Communication Port" is meant an port or a connector for a communication input or output, such as a USB port or a micro-USB port.

By the term "Peripheral Interface Port" is meant a port or socket by which a peripheral device may be connected.

By the term "GEM" is meant gigabit Ethernet module.

By the term "SFP" is meant small form factor plug.

By the term "Interconnect Unit or (ICU)" is meant a unit in which the downlink and uplink optical fibers carrying digital optical signals can be bundled with the downlink and uplink optical fibers carrying optical RF communications signals.

By the term "Central Ethernet Unit or (CEU)" is meant a component that houses and powers one or more centralized Ethernet modules.

Turning now to the drawings, FIG. 1A depicts an example of a prior art wireless distribution system (WDS). FIG. 1A illustrates distribution of communications services to coverage areas 10(1)-10(N) of a DAS 12, wherein 'N' is the number of coverage areas. These communications services can include cellular services, wireless services such as RFID tracking, Wireless Fidelity (Wi-Fi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N).

Each remote antenna unit 14(1)-14(N) may include an RF transmitter/receiver (not shown) and a respective antenna 24(1)-24(N) operably connected to the RF transmitter/receiver to wirelessly distribute the communications services to user equipment 26, e.g., cellular telephone client devices, within their respective coverage areas 10(1)-10(N). The remote antenna units 14(1)-14(N) are also configured to receive uplink communications signals 20U from the user equipment 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the user equipment 26. User equipment 26 usually have a fixed RF receiver sensitivity, so that the above-mentioned properties of the remote antenna units 14(1)-14(N) mainly determine the size of their respective remote coverage areas 10(1)-10(N).

Figure 1B:
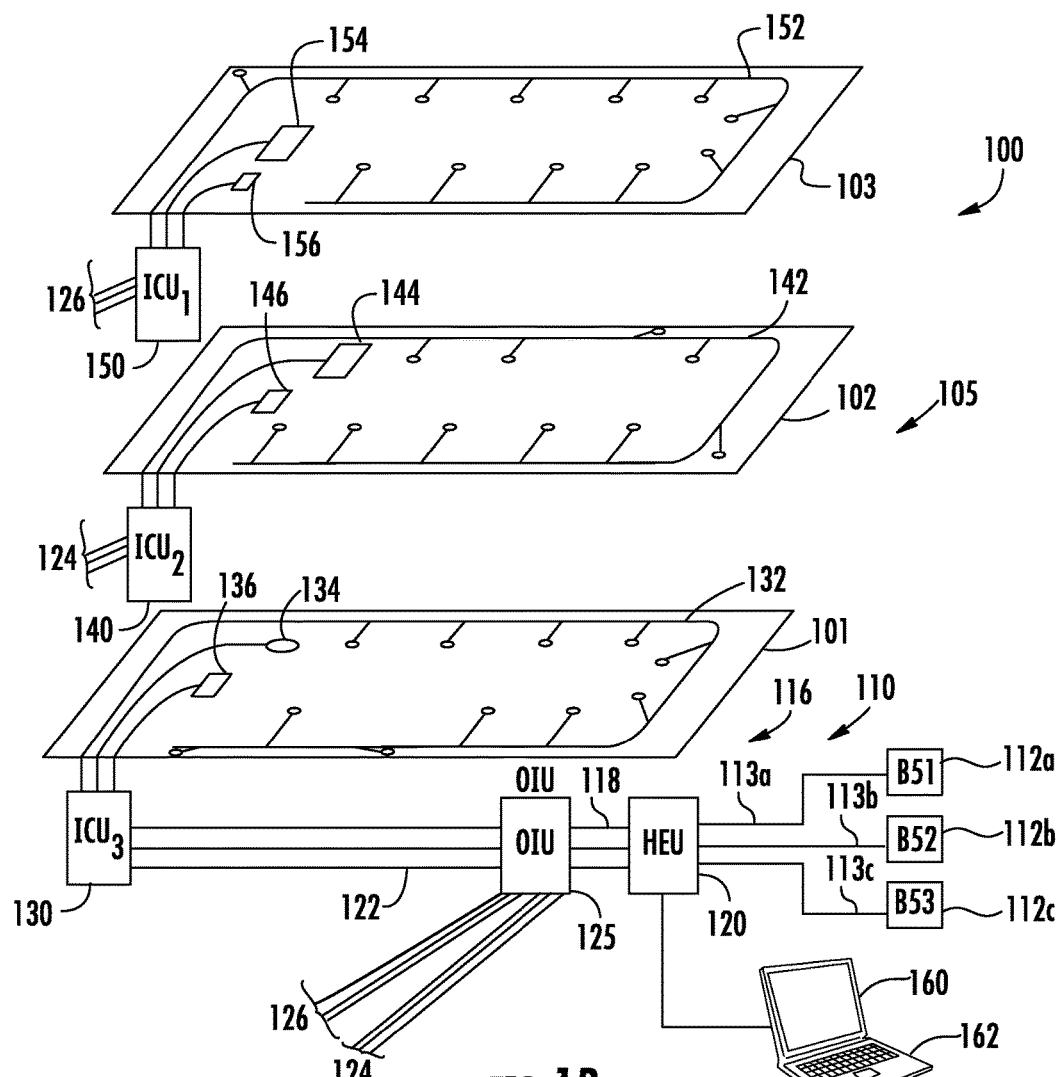
FIG. 1B is a schematic diagram of an exemplary communications system of the prior art configured to distribute communications signals within an installation, such as a building.

One illustrative wireless distribution systems (WDS) is a distributed antenna system (DAS). FIG. 1B depicts an example of a distributed antenna system (DAS) 100 for a first 101, a second 102 and a third 103 floor, respectively, of a building 105. In this example a plurality of communications services 110 are provided, such communications coming from first, second and third base stations 112a, 112b 112c over cables 113a, 113b, 113c respectively, from service providers. The services are input to a head end unit (HEU) 120 for routing through distributed antenna system 100. The distributed antenna system 100 is controlled by a computer 160 with operator input device 162. The computer may include local memory and may have access to remote memory, as well as computer programs stored on at least one non-transitory medium, either locally or remotely. The computer 160 may be connected directly to the head end unit 120 and may be in control of other elements of the distributed antenna system via wired connections or remotely, as shown. The computer system may also control an optical interface unit 125.

The communication services are illustratively routed through distributed antenna system 100 as shown in FIG. 1B. Cable or hard wire outputs 118 from the head end unit 120 may connect to the optical input unit 125 and then to interconnect units 130, 140, 150 for serving the first, second and third floors 101, 102, 103 of building 105. Interconnect units 130, 140, 150 provide mechanical interfaces and power to the cable outputs from the interconnect units.

The computer 160 may be used to control the head end unit, the optical input unit and the interconnect units of the system. The computer may also control or monitor switches and switch matrices of the head end unit and optical input unit useful in operation of distributed antenna systems. The computer may be supplied with a non-transitory memory and a computer program useful for routing the signals through the system. Within each floor, the services are then provided separately, as shown. Thus, the first floor 101 may be provided, through its interconnect unit 130, with an Ethernet wire distribution 132, a Wi-Fi hot spot 134, and a telecommunications antenna 136. In this example, similar services may be provided to the second and third floors 102, 103, through their interconnect units 140, 150 with Ethernet lines 142, 152, Wi-Fi hot spots 144, 154 and telecommunications antennas 146, 156. The Wi-Fi hot spot and/or telecommunications antenna may be provided by a remote antenna unit which may include an RF transmitter/receiver (not shown) and a respective antenna (not shown) operably connected to the RF transmitter/receiver to wirelessly distribute the communications services to user equipment (not shown). Examples of user equipment include a cellular phone, a smart phone, or other mobile device, such as a laptop, a pad, a tablet or a personal digital assistant. It will be appreciated that any computing device configurable for mobility, such as a personal computer, provides an alternative illustrative example of user equipment since the mobility of these devices within a network may accomplish the teachings of this disclosure.

Having thus provided an overview of a wireless distribution system, we now turn to features provided by this disclosure. Broadly speaking, a communication system according to this disclosure includes a computing device configured to serve as a client device to a wireless distribution system (WDS) includes a memory; a multiple applications processor in communication with the memory and configured to execute one or more mobile applications; and a wireless service processor in communication with the multi applications processor for communicating via a corresponding wireless service with the wireless distribution system (WDS). The multi applications processor is configured to execute an instance of a data service to establish a connection with the wireless distribution system (WDS) for a specified application process utilizing the wireless service to provide at least one datum on the wireless distribution system (WDS). In the method, an instance of a data service is executed to establish a connection with a wireless distribution system (WDS) for a specified application process utilizing a wireless service to provide at least one datum on the wireless distribution system (WDS).

Figure 2A:
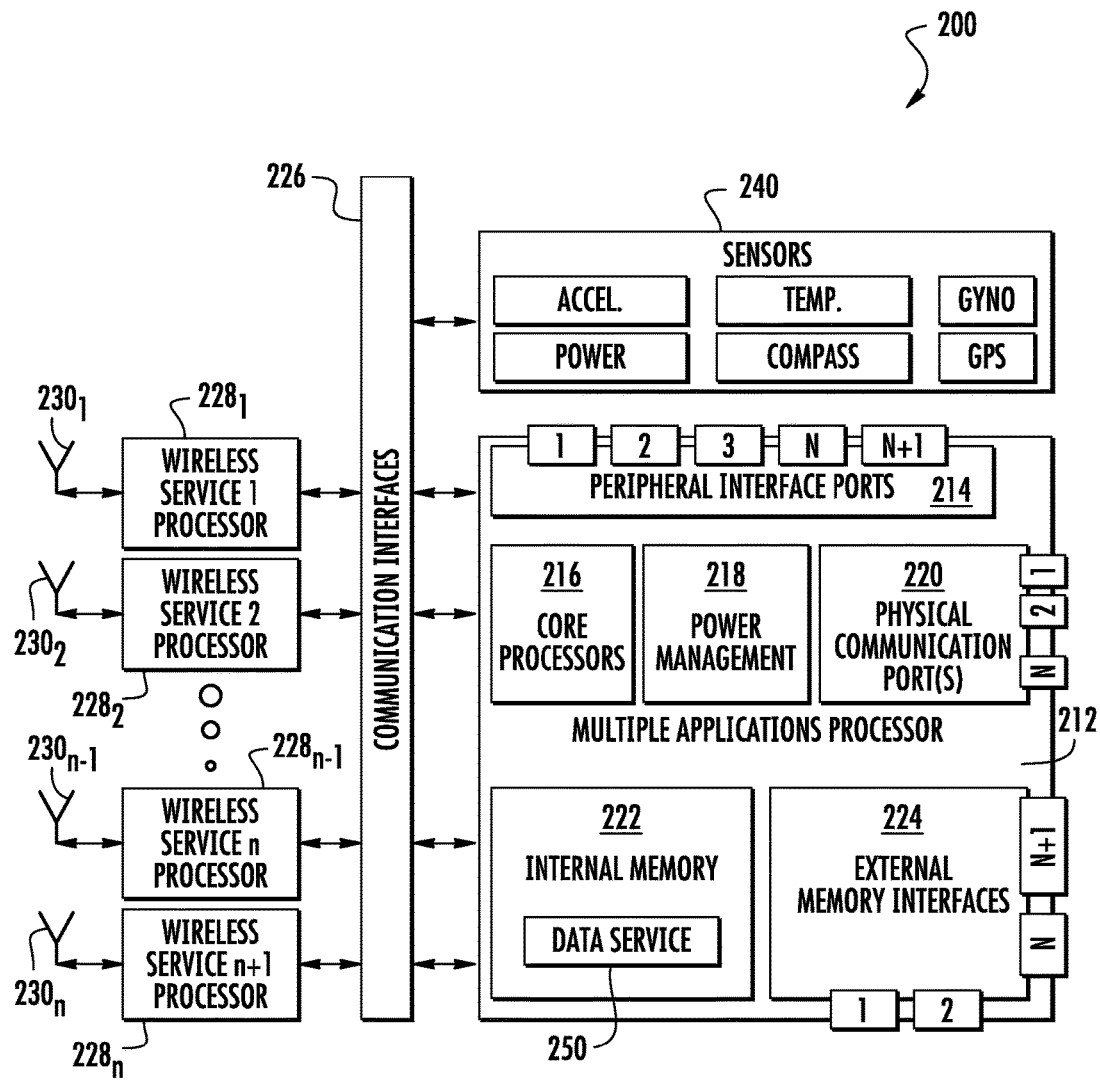
FIG. 2A is an exemplary client device according to an embodiment of this disclosure.

FIG. 2A depicts a client device 200 for use in a wireless distribution system (WDS) according to this disclosure. The client device comprises a computing device configured to serve as a client device to a wireless distribution system (WDS). The client device comprises a memory which may be internal memory 222, external memory (not shown), or a combination thereof a multiple applications processor 212 configured for communication with the memory; and one or more wireless service processors $228_1$ through $228_n$, configured for communication with the multi applications processor. The wireless service processor is configured for communicating via a corresponding wireless service with the wireless distribution system (WDS) as explained below. Advantageously, the multi applications processor is configured to execute a mobile application 250 to provide a data service according to this disclosure. The mobile application is illustrative depicted to reside in internal memory 222 but may reside in external memory (not shown), or reside in both internal and external memory. The data service is configured to provide the wireless distribution system (WDS) with at least one datum on the transmitted downlink signal or the received uplink signal of the wireless distribution system (WDS).

The multiple applications processor 212 illustratively includes one or more core processors 216, a power management module 218 and one or more physical communication ports 220 and a plurality of peripheral interface ports 214. Multiple applications processor 212 may also include one or more external memory interfaces 224 for connecting to external memory (not shown). The multiple applications processor further provides a communications interface 226 for connecting the components of the multiple applications processor 211 to the plurality of wireless service processors $228_1$ through $228_n$ and their respective antennae $230_1$ through $230_n$. The communications interface may be a cellular modem interface, a Bluetooth® modem interface, a Wi-Fi interface, or any other interface suitable for handling communications between the client device 200 and a wireless distribution system. Illustratively, the wireless service is selected from the group consisting of cellular, Wi-Fi, RFID, Satellite, Bluetooth, and ZigBee.

The wireless service processors $228_1$ through $228_n$ are configured to send and receive wireless communications signals over respective antennas $230_1$ through $230_n$. The wireless service may be selected from the group consisting of Wi-Fi, Bluetooth, Ethernet, DSL, LTE, Wireless Access Points (WAPs), PCS, 2G, 3G, 4G, Remote Radio Heads (RRH), Radio over Fiber Optic Cable (RoF), WiMax, LAN, CDMA, TDMA, GSM, WDM and WLAN. The wireless service processors $228_1$ through $228_n$ facilitate communicating application level information received through the communications interface 226 in a wireless distribution system (WDS). The wireless service processors $228_1$ through $228_n$ also facilitate the client device 200 being able to communicate application level information, wired or wirelessly, to other systems (not shown) outside the wireless distribution system, if desired. Wireless service processors $228_1$ through $228_n$ may be digital signal processors.

With continuing reference to FIG. 2, the client device 200 the multiple applications processor 212 handles all input and output communication of the client device. The multiple applications processor 212 may include multiple core processors or a multi-core processor 216. The core processors 216 execute applications of the multiple applications processor 212. The mobile application may be selected from the group consisting of call reception, call origination, Short Message Service (SMS) texting, Instant Messaging (IM), a data application, an email application, a word processing application, a camera application, a presence application, gaming application, a music playback application, a video playback application, a social media application, a voice command mode, and a hands-free mode.

The application level information is stored by the processor 212 in the internal memory 222. The power management module 218 of the multiple applications processor 212 manages power consumption in the multiple applications processor to achieve the desired performance levels. The one or more physical communications ports 220 provide wired communications to and from the equipment, if desired. For example, a technician may connect a wired communication device to one of the physical communications ports 220 to retrieve application level information or to load or update application layer applications. The external memory interfaces 224 may include memory card ports, USB ports, micro-USB ports, etc., for storing data from internal memory 222, including application level information. The peripheral interface ports 214 enable the client device 200 to be connected to peripheral devices.

Client device 200 may also include one or more sensors 240, connected to the client device through the communication interface 226, and also connected for power through the power management module 218. The sensors may include one or more of a global positioning sensor, a temperature sensor, an accelerometer, a power monitoring sensor, a compass, a gyroscope, and the like. Other sensors may be used.

In one illustrative embodiment, the client device 200 may be a user equipment such as a cellular phone, a smart phone, or other device, such as a table or a personal digital assistant containing a multi applications processor configured to execute a mobile application 250 to provide a data service according to this disclosure. In other embodiments, any computing device containing a multi applications processor configured to execute a mobile application 250 to provide a data service according to this disclosure may be used as the computing device of this disclosure.

Figure 2B:
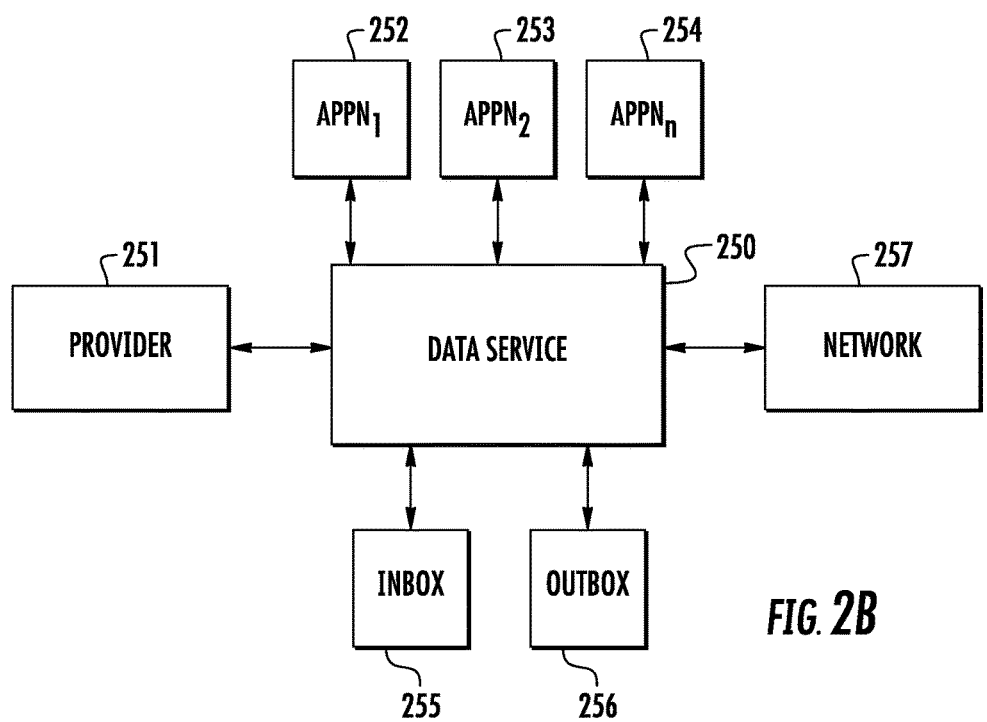
FIG. 2B depicts an exemplary data service provided by the client device of FIG. 2A.

FIG. 2B depicts a data service 250 provided by the client device of FIG. 2A. The data service 250 receives requests from a provider 251 to perform a specification application process 252, 253, 254 with a network 257. If the data service is busy with other tasks, the provider request may be placed in a queue of an inbox 255 for processing by the data service 250 at such time that the data service is available to process the requested task. The application process 252, 253, 254 are specific mobile applications that perform a specific process. The specific mobile applications may be assigned specific process numbers which may be called out in a request made by a provider. This disclosure provides for a myriad of applications which a designer of applications may create as a mobile application for the client of this disclosure. The specific applications may operate with mobile applications that may be readily available on user equipment or like equipment in performing specific process as explained below. These readily available applications may be selected from the group consisting of call reception, call origination, Short Message Service (SMS) texting, Instant Messaging (IM), a data application, an email application, a word processing application, a camera application, a presence application, gaming application, a music playback application, a video playback application, a social media application, a voice command mode, and a hands-free mode. The data service performs the task requested by the provider according to the specific application process number specified in the provider request. The results of the task may be reported to the provider in real time or stored in an outbox 256 for later retrieval by the provider in a batch process.

The data service 250 comprises the software and hardware that provides for the service previously described.

Figure 2C:
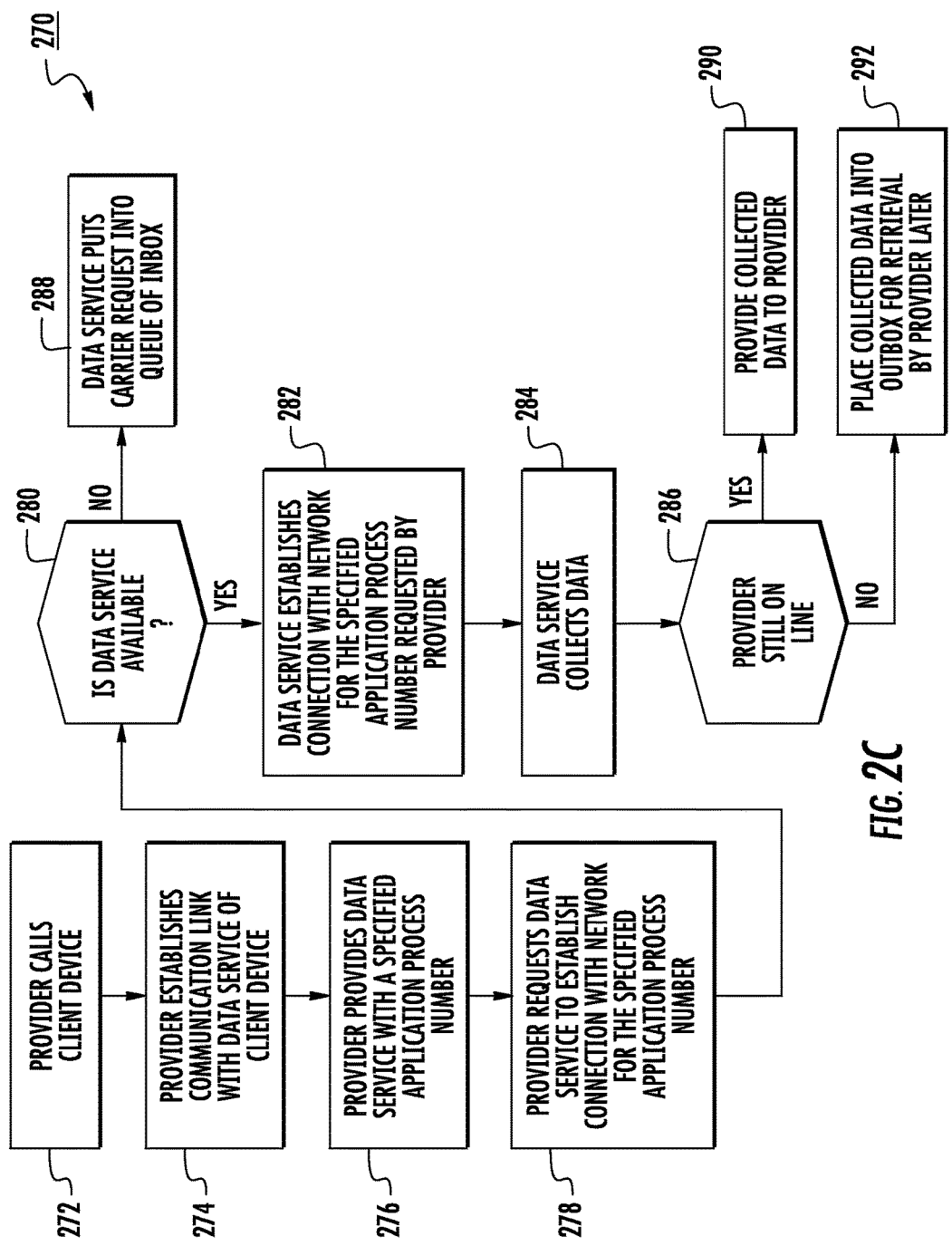
FIG. 2C depicts a process for using the data service by a provider.

FIG. 2C depicts a process for using the data service by a provider. A provider calls 272 the client device, establishes 274 a communication link with the data service of the client device, provides 276 the data service with a specified application process number, and requests 278 the data service to establish connection with the network for the specified application process number. At step 280, the data service determines whether it is available to do the task. If the data service is not available, such as it is performing a different task at the time of the request or the request will take longer to perform than other tasks which have been determined to be of higher priority, then the data service will put 288 the request into the queue of an inbox for processing at such time that the data service is available to do the task. If the data service is available to perform the task, the data service establishes 282 a connection with the network and performs the specified application process number requested by the provider. The data service collects 284 the data that is called for by the specified application process number. The data service then determines 286 if the provider is still on line. If the provider is still on line, then the data service may provide 290 the collected data to the provider in real time. If the provider is not on line, the data service may put 292 the collected data into an outbox for retrieval by the provider at a later point in time.

Figure 3:
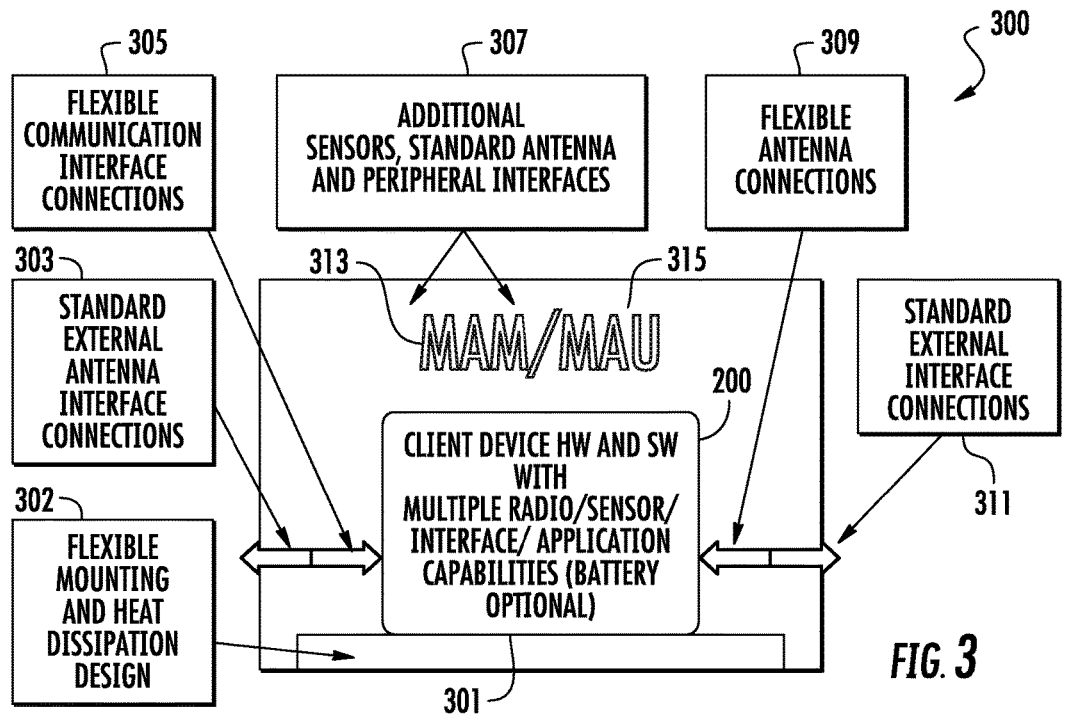
FIG. 3 is a depiction of illustrative exemplary form factors for the client device of FIG. 2A of a multiple application module (MAM) and a multiple application unit (MAU) according to the present disclosure.

FIG. 3 shows illustrative form factors 300 for the client device 200 of FIG. 2. The client device 200 may be in the form factor of a multiple application unit (MAM) 313 or a multiple application unit (MAU) 315. Client device may be in the form factor of a stationary multiple application module (MAM) 313 or a mobile multiple application unit (MAU) 315. Each form factor has particular features which are described in greater detail below. There are also general features common to both form factors. For example, in either form factor, the client device 200 of FIG. 2 has been mounted on a flexible mounting 301, designed for shock absorption and heat dissipation 302. Module 300 may include a standard antenna interface or connection 303, a flexible communication interface or connection 305, a flexible antenna connection 309 and a standard external interface or connection 311. The module 300 may also be equipped with additional sensors, standard antenna and peripheral interfaces 307, 307, such as a temperature sensor for informing users or systems managers of the temperature of the module. Alternatively, or in addition, an accelerometer may be mounted on the module for tracking movement and shock or vibration of the module.

Figure 4:
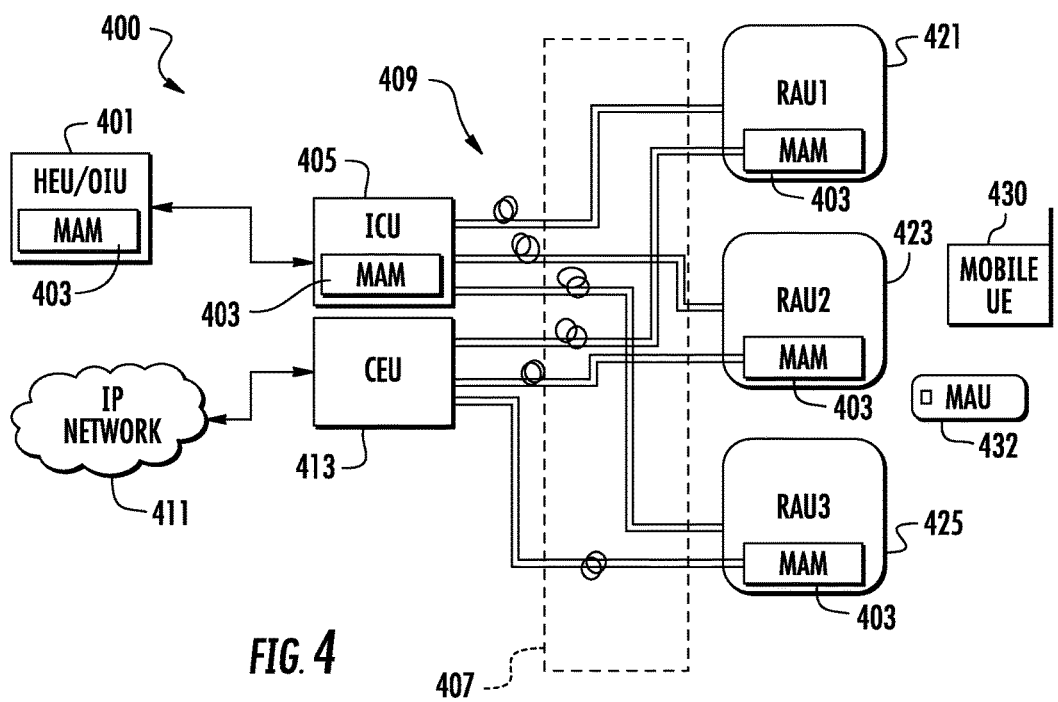
FIG. 4 is a simplified schematic view of an exemplary wireless distribution system architecture that includes a plurality of multiple application modules (MAMs)

FIG. 4 shows the multiple application module (MAM) and multiple application unit (MAU) of this disclosure depicted in FIG. 3 deployed in a wireless distribution system (WDS) 400. In this illustrative embodiment, the wireless distribution system (WDS) 400 is a distributed antenna system (DAS) as described in connection with FIG. 2. The distributed antenna system (DAS) comprises a head end unit (HEU), optical input unit (OIU), internal connect unit (ICU) 506, a central Ethernet unit (CEU) 413, RAUs 1-3, mobile user equipment 430, multiple application module (MAM) 403, and mobile applications unit (MAU) 432.

The head end unit (HEU), optical input unit (OIU), RAUs 1-3, and mobile user equipment 430 operate as previously described in FIG. 2. The interconnect unit (ICU) bundles the downlink and uplink optical fibers carrying digital optical signals with the downlink and uplink optical fibers carrying optical RF communications signals. The central Ethernet unit (CEU) houses and powers one or more centralized Ethernet modules for use in the distributed antenna system (DAS)

Multiple application module (MAM) 403 and multiple application unit (MAU) 432 may be located throughout the distributed antenna system (DAS). Advantageously, the multi applications processor of each multiple application module (MAM) 403 and multiple application unit (MAU) 432 is configured to execute a data service according to this disclosure. For example, the multiple application module (MAM) 403 in the HEU/OIU provides a data service from the vantage point of the HEU/OIU where the MAM 403 is located. A provider may call the data service as described in connection with FIG. 2C to request a specific application process number that may illustratively utilize the mobile applications previously described such call reception, call origination, Short Message Service (SMS) texting, Instant Messaging (IM), a data application, an email application, a word processing application, a camera application, a presence application, gaming application, a music playback application, a video playback application, a social media application, a voice command mode, and a hands-free mode. Specific application processes are described later below. Similarly, the multiple application modules (MAM) 403 in the ICU and CEU, respectively, provide a data service as explained below from the vantage point of the ICU and CEU where the MAMs 403 are located. Note that the MAM may be associated with the HEU, the OIU, the RAU, an intermediary component, or with any one or combination of components in the DAS. Similarly, the multiple application modules (MAM) 403 in the RAU1, RAU2, and RAU3, respectively, provide a data service as explained below from the vantage point of the RAU1, RAU2, and RAU3 where the MAMs 403 are located. Finally, MAU 432 provides a data service as explained below from the vantage point of the location in the distributed antenna system where it is located. In each case where the MAM is used in the WDS, such as a DAS, the physical assembly may be connected to HEU/OIU, RAU, CEU, ICU, or other component of the DAS or WDS by wired or wireless connection. The MAM may be incorporated into the remote unit of a WDS in such a way to leverage its existing wired and wireless interfaces. The MAM may be networked to the head-end unit by designing wired and or wireless interfaces between the MAMs in the remote and head-end equipment. Similarly, the physical assembly of the MAU may be connected to the DAS or WDS by wired or wireless connection. In another embodiment, the MAM may be networked to the cellular communication systems using corresponding wireless/wired interface of the head-end equipment thereby avoiding IT firewalls.

In the example depicted in FIG. 4, at least one additional service is provided from a cloud-based IP network 411 through a central Ethernet unit (CEU) 413.

As indicated, each MAM and MAU of this disclosure may be advantageously accessed by a service provider to perform one or more or other specified application processes as explained below. Hence, the service provider can interrogate the MAMs and MAU which may provide data service on the overall Quality of Service (QoS), as well as bit rate and bit error rate of the signal provided by the carrier as explained below. Effectively, FIG. 4 provides a ONE wireless system with MAMs incorporated in to HEU, OIU, ICU and RAUs. In the illustrative example of FIG. 4, an MAU is also provided. The MAMs and MAUs connected to the WDS may be connected to each other via wired and or wireless media. The user equipment or like equipment of the disclosed client of the MAMs and MAUs thus provide additional nodes in the WDS network that are available to providers for communication within and outside a WDS.

In addition, the network may be extended by deploying MAMs or MAUs beyond the RAU coverage area and networking back to the MAM or MAU in the coverage area of the RAU via wired or wireless interfaces of the client device of the MAM or MAU of this disclosure.

The MAMs or MAUs may be configured as client or master. A client MAM or MAU may automatically detect MAMs or MAUs in its vicinity using different optional communication interfaces and media and configure/change configuration accordingly.

The Wi-Fi capabilities/Bluetooth/wired interface of the user equipment or like equipment of the client of this disclosure may further be used to extend the WDS network. For example, the Wi-Fi hotspot capability of the user equipment or like equipment to a network may allow a client to act as a hotspot external to the RAU. In certain applications, more than one MAM or MAU may serve as a Wi-Fi hotspot client to in the WDS.

Using internal sensors of the user equipment or like equipment, the orientation of the MAM or MAU may be known and used to optimize antenna radiation to achieve communication media optimization. Bluetooth may be used to extend the MAM or MAU deployed network beyond the RAUs to provide extended network for better coverage, capacity and accuracy applications. For example, a MAM at the edge of coverage of an RAU may be used to extend the coverage of the RAU to include the coverage provided by Bluetooth.

Applications running on the MAM or MAU may change over time, periodically or otherwise, to different applications to allow the MAM or MAU to communicate with different components in the network or other MAMs or MAUs. For example, an application on one MAM may switch from hotspot configuration to client and vice versa to enable different communications and networks. Alternatively, more than one application may be running on an MAM or MAU. The applications running on the MAM or MAU may be used to change the cellular backhaul of the MAM or MAU to wired intranet of the WDS. The USB-to-Ethernet to fiber optic network feature of the user equipment or like equipment may be used to extend the network of MAMs and MAUs. Similarly, the USB-to-fiber optic network feature of the user equipment or like equipment may also be used to extend the network.

The internal high processing capabilities and memory of the MAMs and MAUs may be used to share the work load of WDS component modules/units. A MAM or MAU as a network element of the WDS may collect information relevant to specified application process number as previously described by doing the following and executing processes guided by these inputs and prioritization and execution policies. For example, a specified application process may cause the data service to (i) communicate with its internal sensors/processes/events using existing hardware and software methodologies similar to those of the user equipment or like equipment; (ii) consolidate requests from (a) users/appliances within its coverage area (b) from the users/appliances in the WDS coverage area via the network of MAMs and MAUs and form the other relevant WDS network elements utilizing standard communication interfaces on the user equipment or like equipment; (iii) provide for an overall mitigation and consolidation of specified application(s) processes based on the requests from individual users received by the individual MAMs and MAUs; (iv) consolidate relevant requests from the users/events/appliances outside the WDS via relevant communication systems; (v) automatically or otherwise correlate relevant information on the internet and related indoor parameters and corresponding decision making.

For example, a user equipment or like equipment of the client of this disclosure may be used to minimize/optimize electric/battery power consumption by, for example, (i) leveraging the user equipment or like equipment's 'multi-radio in a single package' to enable the Wi-Fi, Bluetooth, ZigBee technologies and related networks within the WDS; (ii) continuously charging the stationary MAM or MAU with constant power feed and run power hungry processes via direct electric power feed rather than utilizing the battery; (iii) coordinating scheduling of MAM's or MAU's wireless radio activation/deactivation and processes execution (a) with power usage monitoring and correlation, (b) by delegating the execution load to other MAMs via distributed process execution, (c) by using 'power utilization-process execution' emergent knowledge to further refine the prioritization and execution policy, (d) by correlating heat dissipation trends indicated by temperature sensors of the MAM and MAU and their peripherals to processes running on the MAM to extend the battery life and MTBF of the MAM itself; (iv) in case of electric power loss from the constant power feed, activating different execution policies that are designed to minimize the power consumption and execute emergency services only; (v) sharing and extending the work load of WDS component modules/units by utilizing the MAM's and MAU's internal high processing capabilities and memory. Depending on the needs of the application on the user equipment or like equipment, a portion of the hardware and/or software of user equipment or like equipment may be modified or added to enable/add other applications.

Figure 5A:
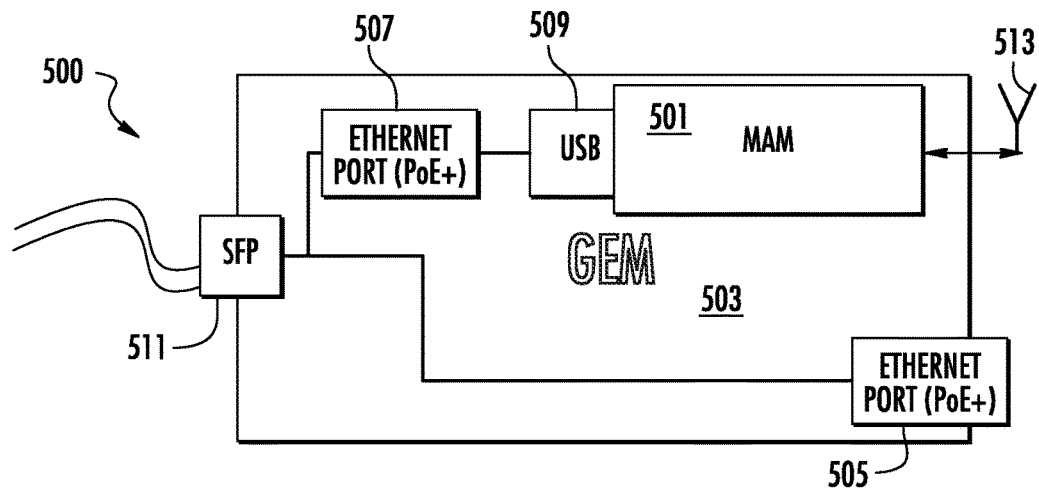
FIG. 5A is an exemplary Gigabit Ethernet Module (GEM) useful for incorporating a MAM into a remote antenna unit, also known in this disclosure as a remote unit (RU)
Figure 5B:
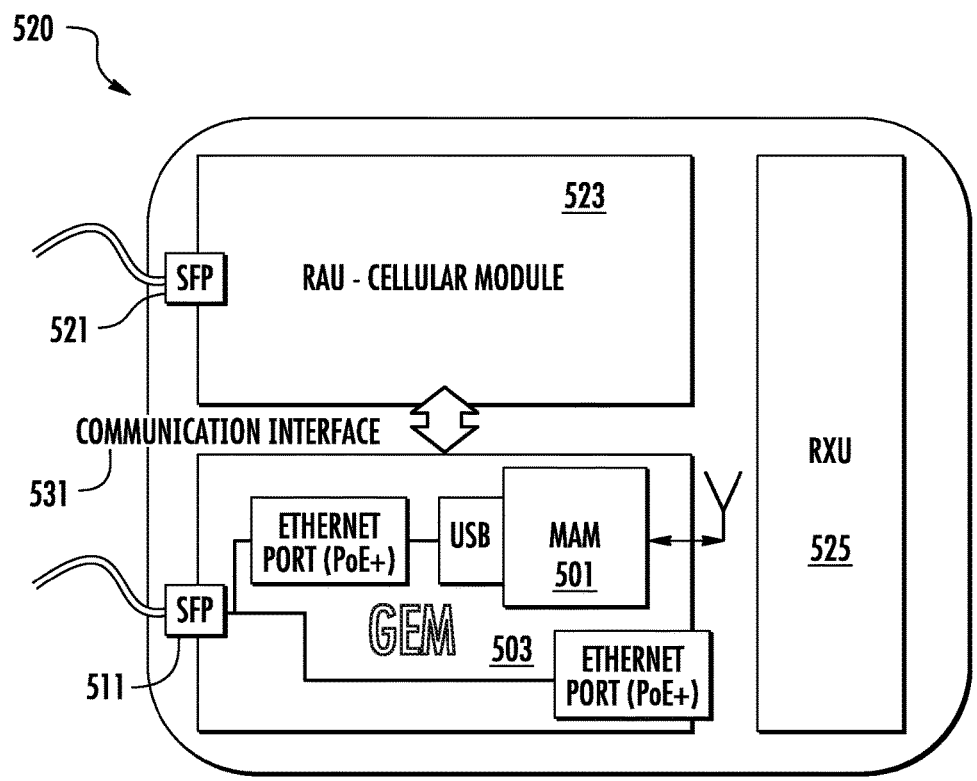
FIG. 5B is the GEM of FIG. 5A incorporated into a communication architecture of a remote antenna unit for interfacing the MAM.

Additional embodiments of the MAM and MAU is given in FIGS. 5A and 5B. FIG. 5A depicts the incorporation of a multiple application module (MAM) into a gigabit Ethernet module (GEM) of a remote antenna unit 500. In this example, remote antenna unit 500 includes a multiple application module 501, similar to the multiple application modules studied above. The remote antenna unit connects via a wired connection 511 to a communication input, such as an optical input module from an optical input unit, also studied above. The connection 511 may be a small form factor pluggable (SFP) connector or plug. In this example, the remote antenna unit 500 also includes a GEM 503 with an Ethernet PoE+ port 505, i.e., providing power as well as a communications connection. A second PoE+ port 507 connects power and communication via a USB connector 509 to the MAM 501. The MAM 501 and remote antenna unit also include a power output, e.g., antenna 513 for sending and receiving communications signals. In this example, the MAM takes advantage of the power available from the PoE+ port and also utilizes the available bandwidth of one or more of the GEM ports. In this example, the remote antenna unit may support a plurality of communications bands, e.g. four bands. These bands may include, for example, a Personal Communications Services (PCS) band, an LTE 700 radio band, a U.S. Cellular™ band and an Advanced Wireless Services (AWS) band. Other communication service bands include frequency ranges such as 400-700 MHz, 700 MHz-1 GHz, 1 GHz-1.6 GHz, and 1.6 GHz-2.7 GHz. The connections with a PoE+ port may be via composite cable or in another manner.

A further advantage of this configuration is possible and desirable, if both the remote antenna unit and the multiple application module use the same operating system. In this scenario, additional apps and software for the MAM may then be developed by developers using the same software development kit to develop wireless distribution system applications using known techniques and methods. With this focus, centralized application software can be automatically generated or developed for quick adaption to the apps already used in the MAMs. This technique thus leverages existing people, programs and applications for further development and better apps.

FIG. 5B adapts this technology in another way and extends the technology, depicting a more complex communication architecture for a remote antenna unit 520. In this architecture, the remote antenna unit includes the GEM 503 discussed above, with a multiple application module, the dual Ethernet PoE+ ports and the plug-type connection 511. In this adaptation, there is an additional communication interface 531 between the RAU 500 and an RAU-cellular telephone 523 portion of remote antenna unit 520. There is also a receiver unit (RXU) 525 for supporting communications input and output. The combination of the RAU 503, the RAU-cellular module 523 and the RXU 525 may support quite a bit more bandwidth than the RAU 500 itself. In this example, module 520 may have sufficient bandwidth to support 6 bands, e.g., the four bands mentioned above and two additional bands, e.g., two bands selected from among Global System for Mobile (GSM) communications 900, GSM 1800, UMTS, CDMA, TDMA, and so forth.

Incorporating wireless modules with their greater communications capabilities thus allows manufacturers and users to scale their networks. The network or system is extended by deploying MAMs beyond the remotes in the coverage area and wirelessly networking back to the MAM in the RAU. The MAMs can be configured as client or master and client to automatically detect other MAMs in the vicinity using different optional media and can configure or change configuration accordingly. Such automated correlation with the available information and related indoor and outdoor parameters and corresponding decision making will enable proactive actions rather than reactive actions.

The advantage is that incorporating the MAM into the remote antenna unit, just like incorporating the MAM into the head-end equipment, will make additional applications possible in the wired networks. For example, one would not expect to access wireless services over a typical office or home phone. As discussed above, however, connecting a multiple application module into a remote antenna unit can enable wireless services such as Wi-Fi, Bluetooth® and ZigBee®. Thinking of a multiple application module as a compact supercomputer, e.g., a smart phone, these applications become available and greatly expand and scale-up the choices and options available to users connected to such a system.

One example is the ability to offload Wi-Fi to the (wireless) IP network via the gigabit Ethernet module and the central Ethernet unit. Enabling a MAM to connect to IP network via GEM and CEU would allow for continuous monitoring of the link to IP network and the Wi-Fi connection between the MAM in the RAU and the extensions by test calls. A distinct advantage would be communicating the call metrics with the Wi-Fi offload server. This would allow standard operation of a wired network's quality of service (QoS), with traceability and tracking as well. This is also known as enabling a backhaul capability between an end user and a service provider, such as a cellular telephone network provider.

Another example is creation of a Wi-Fi hot spot using the MAM and the RAU. A Wi-Fi hotspot can be used to create machine-to-machine network communications between MAMs wired to the wireless distribution systems (WDS) and those MAMs that are wirelessly connected to extend the WDS network. Connecting the multiple application module creates a wired connection which may have a higher bandwidth than the wireless connection. By enabling a wired backhaul with a better backhaul bandwidth, the capabilities of the network may be beyond the typical cellular backhaul. Thus, a high-bandwidth Wi-Fi hotspot can be achieved. An additional advantage is that applications running on the MAM can change to different wireless networks (identified by their service set identifier, SSID) to communicate with different clients and networks. Users or equipment can thus switch from hotspot configuration to client and vice versa to enable different communications. Simultaneous operations may also be possible, if there is sufficient bandwidth capability. It should also be clear that using applications running on the MAM, the cellular backhaul of the MAM for Wi-Fi hotspot can be improved. This would provide an ability to monitor and measure spectrum information, e.g., signals, within the wireless distribution system, tracking quality of the service to all served portions of the distribution system.

One embodiment is a communication system as described above, wherein the client device is a peripheral interface port configured to interface a peripheral device to the client device. Another embodiment is the communication system as described above, wherein the client device is a physical communication port configured to allow a physical connection to the client device; another embodiment is the communication device as described herein, wherein the physical communication port is a PoE+ port; another embodiment is the communication device as described herein, wherein the physical communication port is a PoE+ port on the client device, the PoE+ being connected via GEM to the PoE+ on the remote antenna unit (RAU).

Figure 6:
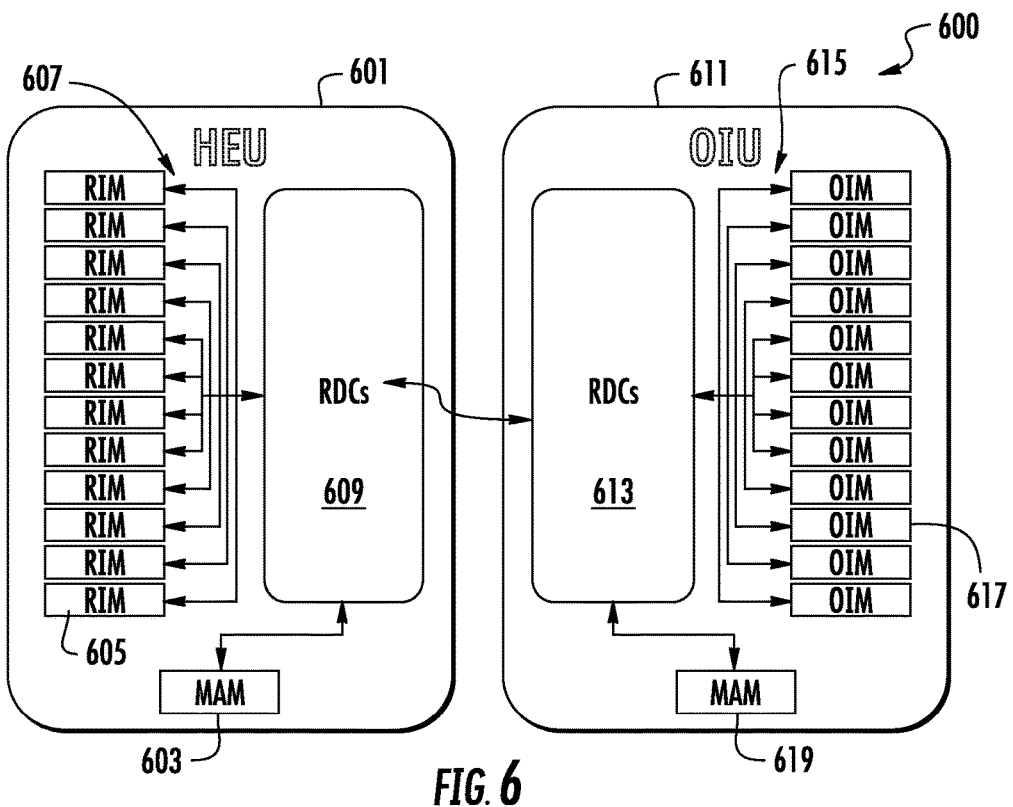
FIG. 6 is an exemplary distributed antenna system that incorporates multiple application modules (MAMs) into both a head-end unit (HEU) and an optical input unit (OIU)
Figure 7:
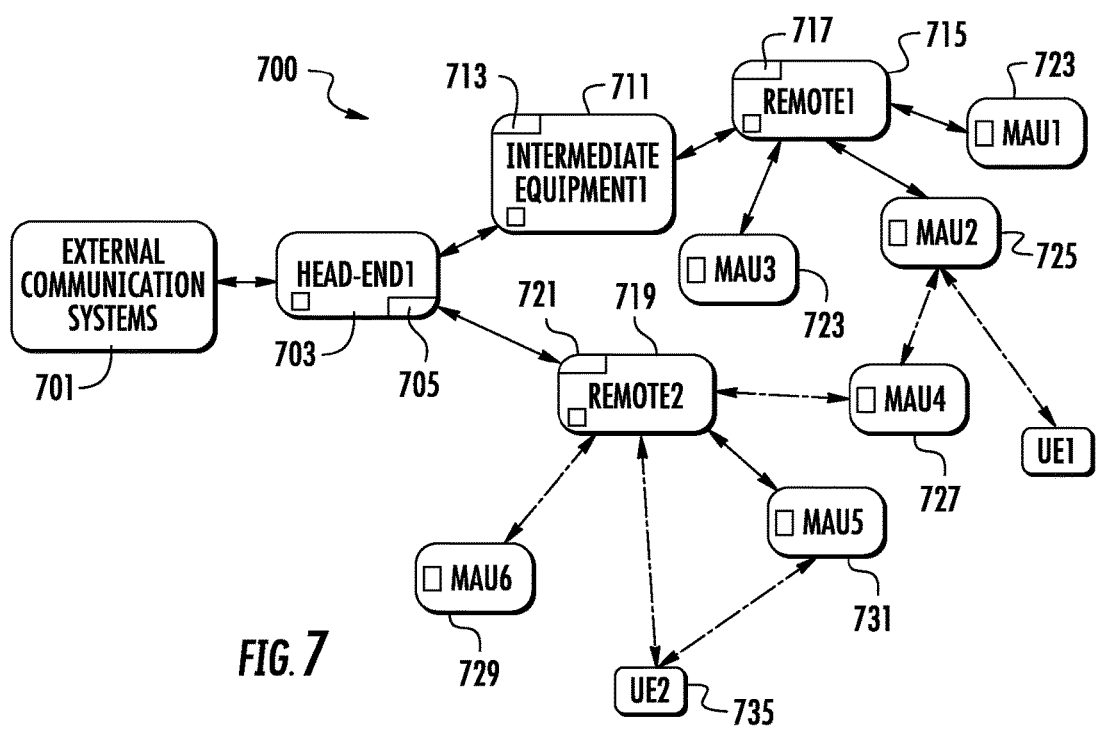
FIG. 7 is an overall architecture of an illustrative exemplary wireless distribution system (WDS) that incorporates both multiple application modules (MAMs) and multiple application units (MAUs) for enhancing the capabilities of the system.

Additional options of leveraging existing systems will become apparent with the disclosure of FIGS. 6-7. The head-end equipment 120, 125 shown in FIG. 1B has been leveraged and its capabilities expanded greatly. Head-end equipment 600 in FIG. 6 includes a head-end unit 601 and an optical input module 611. A plurality of input modules (RIM) 605 provides services from outside communications providers or vendors. These may include wired services and may also include wireless services. The services are connected via wired connections 607 to a plurality of radio distributor combiner cards (RDCs) which connect the services to radio distributor combiner cards (RDCs) 613 in optical input unit 611. The RDCs 609, 613 may simply be circuit cards with appropriate functions to forward the services to and from, as shown. The services received from RDCs may include standard (wired) telecommunications services and may also include wireless communications services. A MAM 603 is in electrical communication with RDCs 609 and a MAM 619 is in electrical communication with RDCs 613. Hence, a provider may call MAM 603 or MAM 619 illustratively according to the procedure detailed in FIG. 2C to request the respective the data service of the MAM to run a specification on the respective MAM for a specific purpose.

For instance, a provider may request the data service on MAM 603 to establish a communication with a service being provided by the RDC 609 to determine the QoS of that service. In so doing, the data service could employ the call origination application on the MAM to place the call to a receiver in the RDC. The RDC would have an application that would allow such a call to be made and processed. The data service on the MAM would then receive the service using the call reception application on the MAM. An application on the MAM, such as a data application, could do a QoS analysis of the signal such as determining its power level, error bit rate, etc. The data service could then employ either the Short Message Service (SMS) texting or Instant Messaging (IM) of the MAM to send the requesting provider the details of the analysis. The MAM could communicate the results to a web portal and may export the results to a social media website using a social media application. The analysis of the data could be formatted, manipulated and reported to the requesting provider via a word processing application on the MAM. The report could be provided via an email application on the MAM.

The provider may make additional requests to the MAM using the applications available on the MAM. For instance, the provider may request the MAM to take a picture of the RDC 609 with which it is located to allow a provider to verify the physical integrity of the RDC. The MAM 603 may be requested to take a video using a video application on the MAM and then play the video back using the video playback application for some purpose. For instance, the MAM may take multiple videos and play back one video feed at a time to extract data from each feed to then report back to the provider. The MAM may provide the provider with one or more video streams as part of any reporting operation.

The hands-free mode of a utility or like application may be used by the provider in a number of ways. For instance, the hands free mode detects the presence or absence of a connection (typically the hands free device). In this disclosure the hands-free mode of operation may be used to detect the presence of absence of a connection. For instance, the connection or no connection of various settings in the RDC may be emulated by the hands free application of the MAM to alert the provider making a request of the settings in the RDC.

In other embodiment, the presence application of the MAM may be used to indicate the presence or non-presence of a connection in the RDC. A voice command mode may allow a provider to make requests and receive reports from the MAM using voice commands.

In one example, a provider may be interested in the quality of a gaming application provided on a service. Using this disclosure, the data service may access the service and access the gaming application provide by the service. The provider may then perform tests on the QoS of the gaming service, for example, with bit checks done on the gaming service provided. Alternatively, the provider may interact with the game service in real time by playing the game using the data service of the MAM. Similarly, a provider may request the MAM to download a stream of music. The data service may then employ the music playback application of the MAM to play the music to the provider in real time. Alternatively, the music feed may be sent to the provider using the previously described reporting mechanisms for the provider to do further analysis.

In many of the foregoing examples, the reporting by the MAM is illustratively performed in response to a request by a provider. Alternatively, a provider might subscribe to the data service of the MAM in order to have the MAM provide such reports to the provider automatically on the occurrence of an event or periodically. In this way, a provider may receive reports from a MAM without the need for making requests.

It is thus seen that the applications that are available on a user equipment or like equipment may be advantageously employed according to this disclosure to generate data on a wireless distribution system and improve the QoS of the WDS. Further the platform provided by the user equipment or like equipment advantageously lends itself to widespread application development to leverage the foregoing and other applications for specific applications. Examples of illustrative applications are described later below A more expansive view of network possibilities is disclosed in the wireless distribution system (WDS) of FIG. 7. This system discloses an architecture that includes multiple application modules (stationary) and multiple application units (mobile). In this system, the WDS 700 includes external communications systems 701, such as service providers. The services may be provided to a building, a series of buildings, or even a venue, such as a theatre, a theatre complex or a large sports stadium. The system 700 includes head-end equipment 703 with one or more MAMs 705. As noted above, head-end equipment may include a head-end unit and an optical input unit, each integrated with an MAM. In the system of FIG. 7, the head-end equipment 703 and the MAM 705 are part of a wired connection to intermediate equipment 711 and its MAM 713. An interconnect unit (ICU) as shown in FIG. 4 is an example of intermediate equipment. A remote antenna unit (RAU) may also constitute intermediate equipment. A first remote unit 715 and its MAM 717 are connected to the intermediate equipment 711. A second remote unit 719 and its MAM 721 are connected directly to the head-end equipment 703. A plurality of multiple application units 723, 725 are connected wirelessly to the first remote unit 715 and its MAM 717, while a plurality of multiple application units 729, 731 are connected wirelessly to second remote unit 719 and its MAM 721. In this example, multiple application unit 727 may be in wireless contact with either or both second remote unit 719 and a multiple application unit 725. First user equipment 733, i.e., a mobile user, is in wireless contact with multiple application unit 725. Second user equipment 735, e.g., a second user, is in wireless contact with either or both second remote 719 and multiple application unit 731.

The system of FIG. 7 extends the network by deploying MAMs to the entire coverage area and beyond by networking the MAMs with remote units and networking back to the MAM via wired and wireless interfaces of the MAMs. In this regard, an MAM includes the capabilities of a user equipment/device, with all the computing and communications capabilities of these devices. The MAMs in the remotes can be configured as client or master and clients. Each will automatically detect all other MAMs in the vicinity using the different optional communication interfaces and media. These MAMs then have the capability to re-configure to use the appropriate communication tool. For example, the system can choose from its Wi-Fi capabilities, Bluetooth® wireless capability or even its wired interface to communicate with other MAMs, remotes and user devices in the vicinity.

For example, any of the remotes can use the Wi-Fi hotspot capability of the mobile user equipment to network with the MAMs external to the remote units with the latter acting as Wi-Fi clients. For certain applications, external MAMs such as 717, 721, 723, can create Wi-Fi hotspot to which MAMs in remote units, such as 719, 725, 731 and other wired components of the WDS can join as clients. The system can also achieve communication media optimization by optimizing antenna radiation. This can be accomplished by knowing the orientation of an MAM using internal sensors of the MAM. In a similar fashion, the MAMs can use Bluetooth® to extend the MAM network beyond the remote units 715, 719 to provide extended network for better coverage, capacity and accuracy applications. For example, applications running on the MAM may change to different IDs transmitted periodically to communicate with different clients and networks. MAMs can switch from hotspot configuration to client and vice versa to enable different communications and networks. The remotes and intermediate equipment, as well as the head-end equipment, can use applications running on the MAM to change the cellular backhaul of the MAM to wired intranet of the WDS.

Other advantages include using a USB or micro-USB-to-Ethernet to fiber optic network to extend the MAM network and using a USB or micro-USB-to-fiber optic network to extend the MAM network. There are many additional possibilities, such as sharing workloads and collecting service information. Capacity steering may be used to improve traffic on the network. For example, location-based information from one or more multiple application modules may be used to gauge traffic density and whether capacity can be increased by switching some users to different bands. It may also be determined that a permanent increase in capacity is needed. An example would be a network whose traffic is sufficiently dense and slow that a cable upgrade may be needed, e.g., to a larger cable or to a high capacity fiber-optic cable.

Using the techniques described herein, one can monitor traffic on the wireless distribution system. It is then possible to use one or more of the multiple application modules to scan available or used bands and the quality of service in the various bands and services provided. For example, the common pilot channel (CPICH) can be used to determine which bands are more-used or less-used and which bands may be better for quality of service at a given time. The collected information, such as CPICH and similar, may be used for SON (self-organized network) applications and MACRO seepage information and adjustment.

Figure 8:
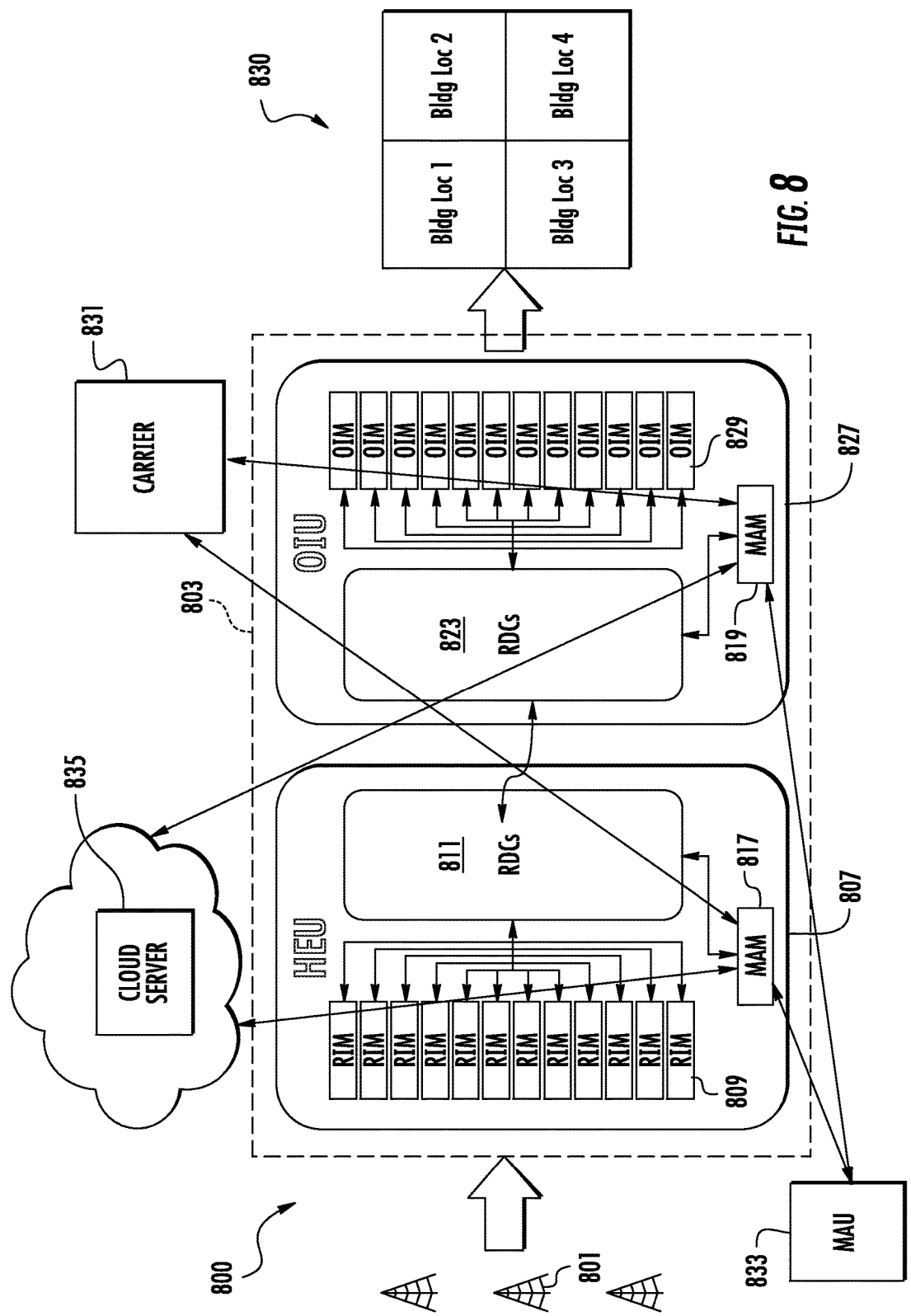
FIG. 8 is an exemplary wireless distribution system (WDS) with multiple application modules (MAMs) and a multiple application unit (MAU) that allows a carrier to track the service it provides through intervening head end equipment.
Figure 9:
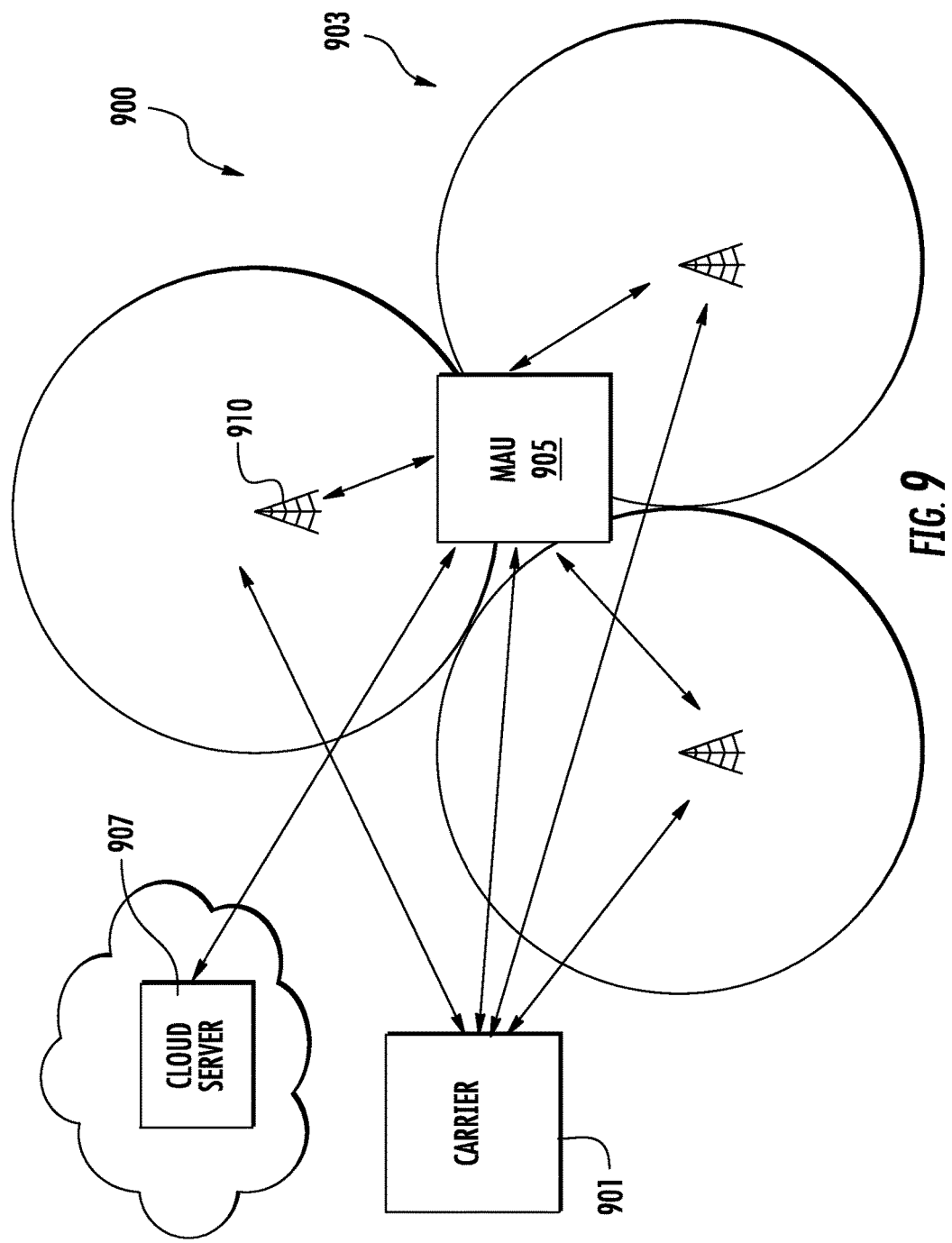
FIG. 9 is an example of a wireless distribution system in which a mobile application unit (MAU) may provide service data to a service provider, such as a carrier.

Some of the advantages of the present disclosure may be seen in FIGS. 8 and 9. FIG. 8 shows the system of FIG. 7, illustrating multiple application modules configured to communicate with a carrier, a cloud server and multiple application units. FIG. 8 illustrates a distribution network 800. The network is served by a plurality of base stations 801 which may be wired, land-line inputs from commercial communications services, e.g., telephone service providers. The stations may also be wireless stations, e.g., cellular telephone towers, providing wireless services. Recall that the providers may provide a great many communications services, including telephone services, wired services, wireless services, Wi-Fi, Wi-Fi hot spots, Bluetooth®, and so forth. The communications services from the base stations and wireless providers are input to a building 803 with head-end equipment 805, the head-end equipment including a head-end unit 807 and an optical input unit 827. Head-end unit 807 receives inputs through input modules 809, which may be radio input modules or may be input modules equipped for wired connections from the service providers. The input modules are connected to the head-end unit output, RDC cards 811, as described earlier. The output of the head-end unit 807 is received by the optical input unit 827 through RDC cards 823, and the various services and sectors are output through a plurality of optical input modules 829. Each optical input module may support a plurality of outputs of lower bandwidth capability, such as a plurality of remote antenna units (see FIG. 1B). In this simplified version one or more optical input modules and remote antenna units may provide services to a plurality of clients 830, e.g., separate buildings or portions of a building, e.g., building locations 1 through 4. These may be separate floors on a single building or portions of a single floor, for example.

Head end equipment 805, including head-end unit 807 and optical input unit 827, is equipped with multiple application modules 817, 819 in the manner discussed previously in this disclosure. Using the multiple application modules 817, 819, the carrier 831 is able to interrogate the head-end equipment. The carrier may also use multiple application unit 833 to communicate with the head-end equipment 805 through multiple application modules 817, 819 to obtain further data on the WDS. For instance the data service of MAU may in response to a request from an MAM 817 or from the provider (such request is not shown) employ the data service of MAM 827 to obtain data on the RDC 823 or to communicate with cloud server 835 or carrier 831. The manner in which a data service is requested and the response of the data service in response to achieve the foregoing and other data metrics and intelligence on WDS occur as previous described.

The data from multiple application modules 817, 819 may also be available through the Internet to a cloud-based service 835, such as a file backup service or files intended for the carrier 831. Without the multiple application modules, the back haul routes discussed above are not available. With the multiple application modules, the carrier is easily able to send information back and forth, including identification information of the end-users and data on the performance of the system, including the quality of the calls or other communication services provided.

FIG. 9 shows a system in which a multiple application unit is configured to communicate with a carrier, a server and one or more base stations. FIG. 9 is simplified example of another wireless distribution system (WDS) 900. The system includes one or more carriers 901 providing services through a series of cell towers 903. Alternatively, or in addition, distribution may be provided through trunk lines and distribution centers. However distribution is effected, the distribution centers or cell towers are equipped with multiple application modules or multiple application units 905. The situation is analogous to others described above, such as installations in buildings or venues, in which service distribution points are equipped with multiple application modules for providing additional services, tracking the services and providing data on the services and how they are provided. For example, a carrier may request the data service of MAU 905 to set the tuner for the transmitter of the MAU to scan the frequency channels to determine the QoS of the signals from one or more base stations with which it is connected. The resulting metrics may inform the provider on which channels might provide service of better QoS in the vicinity of the MAU. In this way, the client device is configured to scan bands available from the base station and determine a quality of service of a scanned band of frequencies. For instance, the quality of service detected by the MAU might be the power level of a scanned band of frequencies.

In addition to communicating directly with the service providers or carriers 901, the multiple application units 905 can communicate indirectly, and perhaps more conveniently, using the Internet and a cloud server 907 that is available to the multiple application units 905, almost regardless of their location; but with location-based services, able to report on their location as well as their service.

Figure 10:
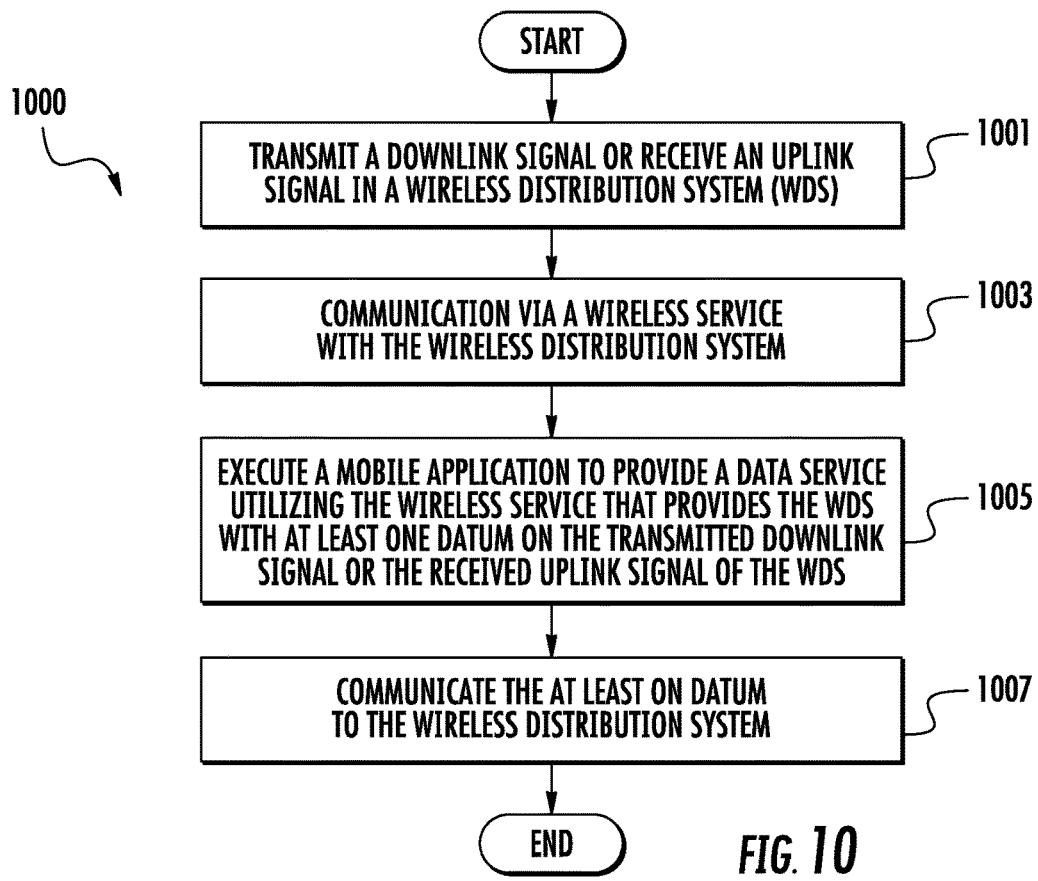
FIG. 10 is an exemplary communication method that allows tracking via a downlink signal or an uplink signal according to another embodiment of this disclosure.

FIG. 10 shows one method of communicating according to the present disclosure. In this method 1000, a provider transmits a downlink signal or receives an uplink signal 1001 in a wireless distribution system (WDS). The signals are used to communicate 1003 via a wireless service with the wireless distribution system. The provider then executes a mobile application 1005 to provide a data service utilizing the wireless service that provides the WDS with at least one datum on the transmitted downlink signal or the received uplink signal of the WDS. The provider then communicates 1007 the at least one datum to the wireless distribution system.

Figure 11:
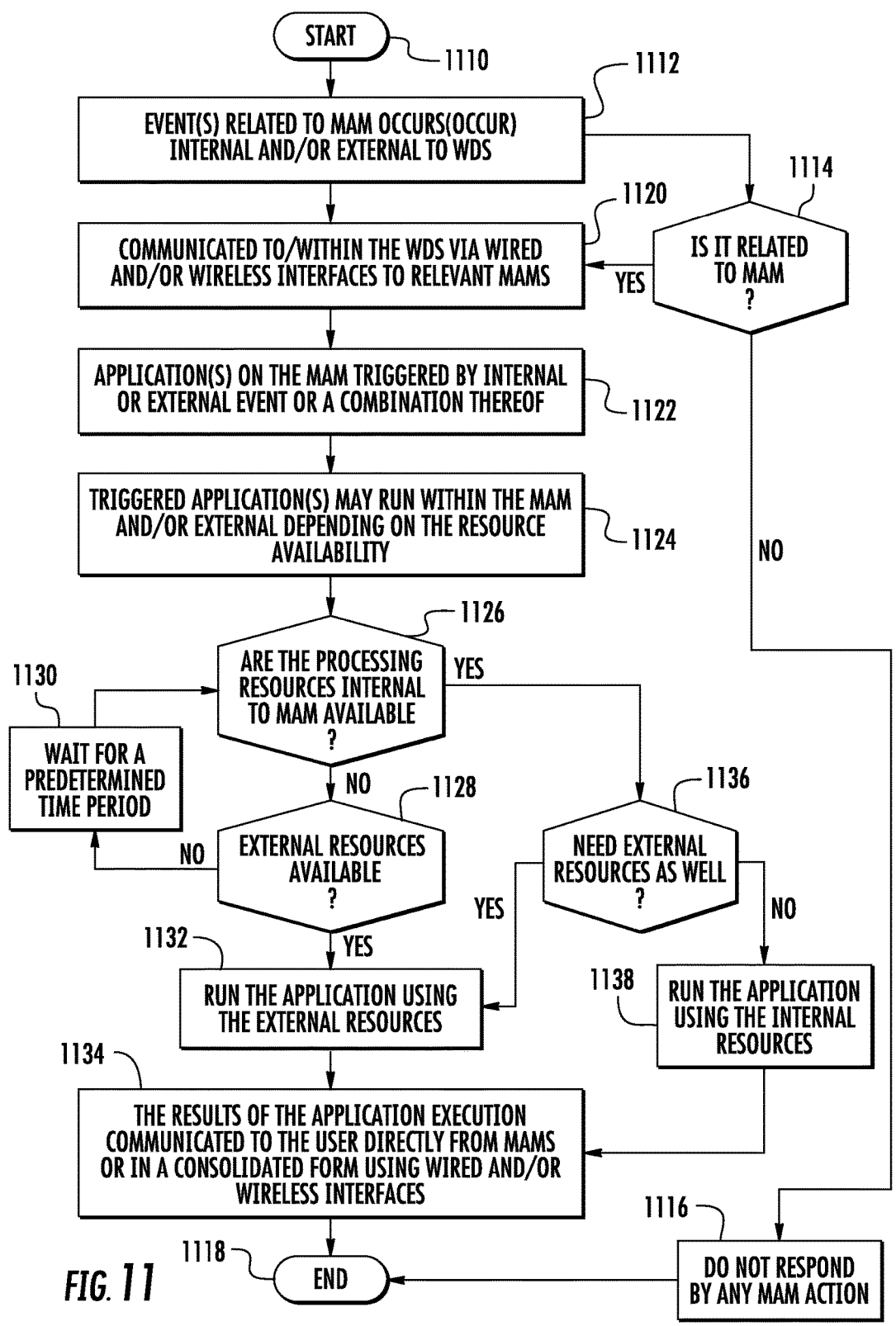
FIG. 11 is an exemplary process for monitoring live signals in a wireless distribution system (WDS) using an MAM, creating application level information about the monitored signals, and communicating the application level information to other systems.

FIG. 11 shows an exemplary process of a MAM monitoring live signals in the WDS, creating application level information about the monitored signals, and communicating the application level information to other systems. This process 1100 can be performed with an application layer application executing in a processor of a multiple application module. In this regard, the process starts at 1110. External or internal events may occur 1112 related to monitoring of signals in a WDS or request for the application level information 35 for a MAM. If the MAM determines that these events are not related 1114, the MAM does not respond to such events 1116 and the process ends 1118. If the event detected by the MAM is related to monitoring of signals or requests to communicate the application level information to other systems in the MAM, the MAM communicates to or within the WDS via wired or wireless communications related to the detected event 1120. The application layer on the MAM is triggered by the internal or external event, or a combination thereof 1122. The triggered application layer application may execute with the MAM and/or external to the MAM depending on resource availability in the MAM 1124. If there are sufficient internal processing resources available in the MAM 1126, the MAM determines whether there is a need for external resources as well 1136 and if no then runs the application using the internal resources 1138. If there are not sufficient processing resources available in the MAM 1126, the MAM determines whether there are external resources available 1128. If not, the MAM waits 1130 until resources are available to process the event. Once resources are available, the application is executed using the external resources to process the event relating to monitoring of signals in a WDS 1132. The application level information generated by the application executing based on signal monitoring can be communicated directly to a user from the MAM or in a consolidated form with other application level information stored in internal memory of the multiple application module using wired or wireless communications 1134, and the process ends 1118.

Figure 14:
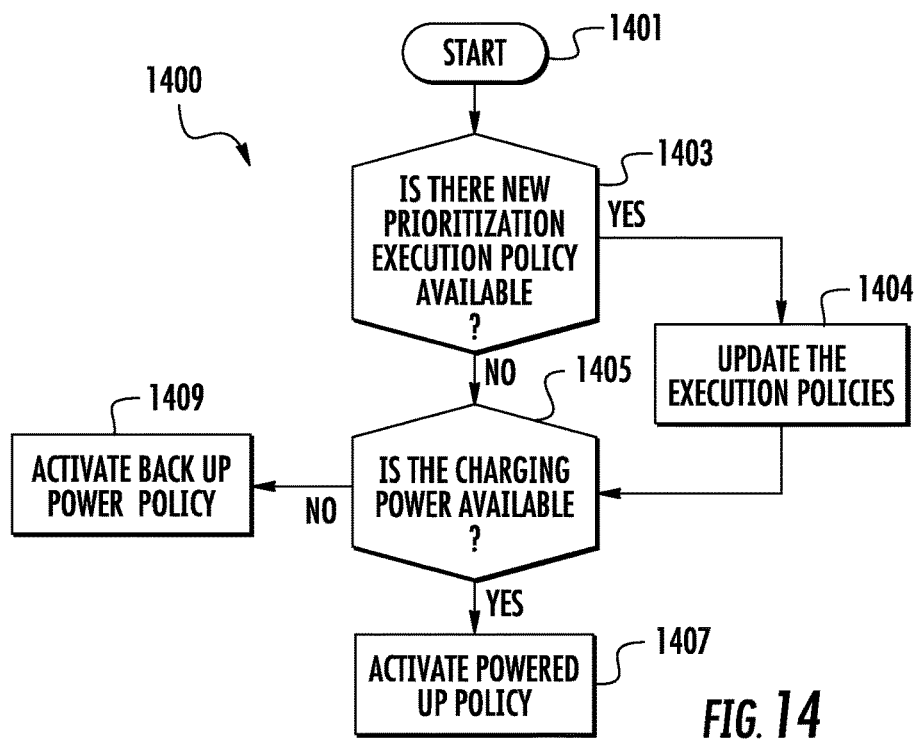
FIG. 14 is an exemplary logic flow for a prioritization policy for a wireless distribution system (WDS) according to another embodiment of the present disclosure.
Figure 12:
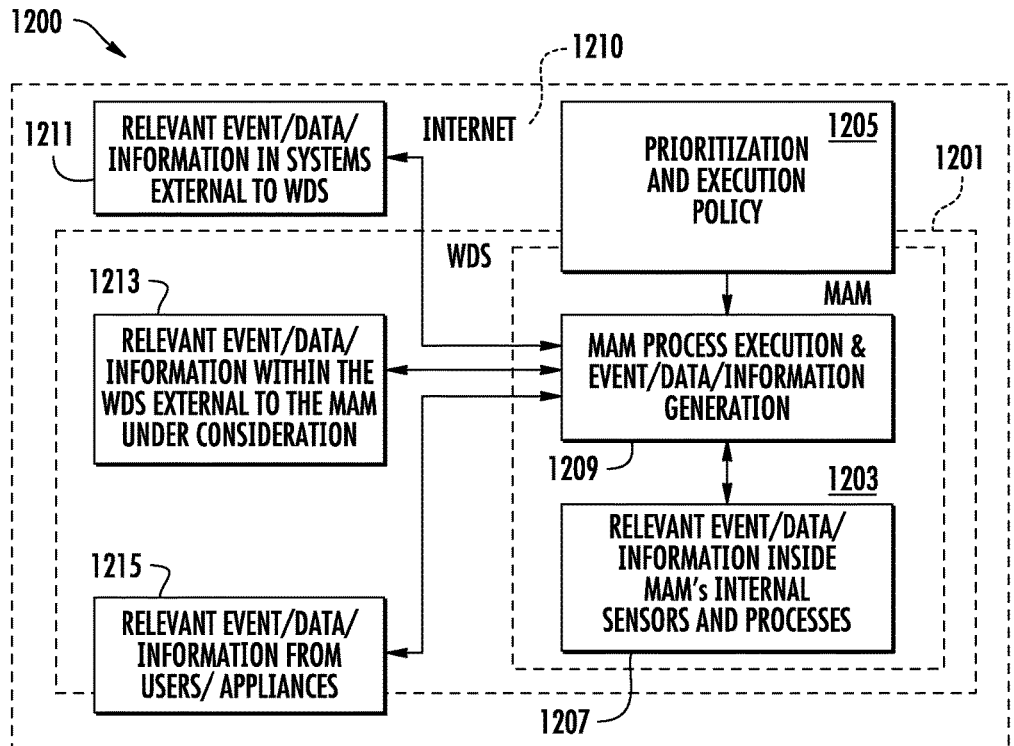
FIG. 12 is a process execution architecture of a wireless distribution system (WDS) that incorporates MAMs.
Figure 13:
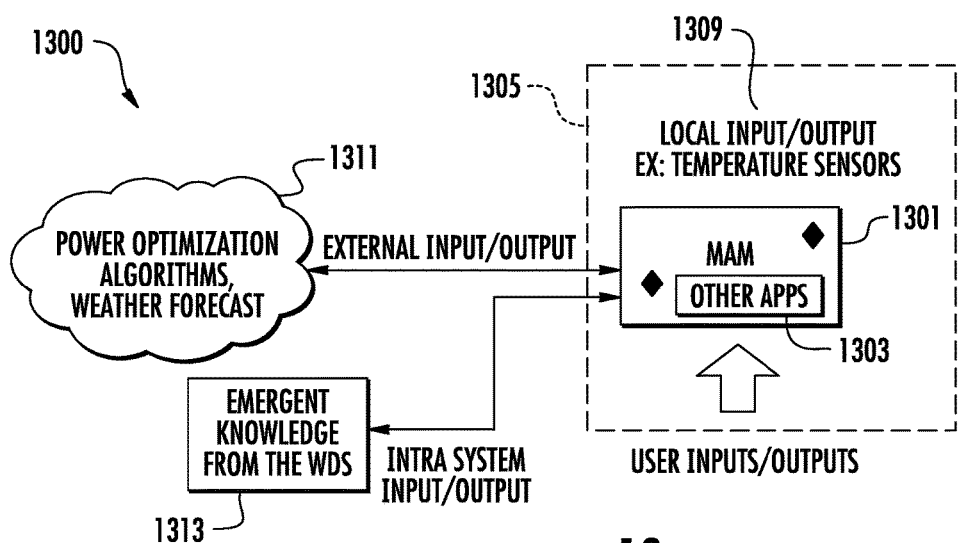
FIG. 13 is an example of an additional capability of a wireless distribution system (WDS) that incorporates at least one multiple application module.

FIGS. 12-14 illustrate some of additional illustrative applications of this disclosure. FIG. 12 is a schematic diagram showing a process execution architecture using multiple application modules as part of a network. FIG. 13 depicts an example of how a multiple application module architecture and methodology is used to control a remote application using such a network, using a multiple application module for a finer degree of control. FIG. 14 is a flow chart or decision process for one application of such a module.

In FIG. 12, a network 1200 includes a wireless distribution system 1201 with a multiple application module 1203, such as one of the MAMs discussed above. The network includes the Internet 1210, or access to the Internet. The memory of the MAM also includes a prioritization and execution policy 1205 and also relevant information, including data and events 1207, of the MAM's sensors and processes. As discussed above, a multiple application module can include sensors, such as: a temperature sensor; a GPS (global positioning system) sensor, a GNSS (global navigation satellite system) sensor, a location sensor; an accelerometer; and the like. The memory of the MAM also includes a program 1209 for process execution and for generation of information, including data and events. The information used by the MAM is gathered from relevant information in systems 1211 external to the wireless distribution system 1201. Relevant information is also gathered from within the wireless distribution system, e.g., from other components and elements 1213 of the wireless distribution system that are external to the MAM 1203. Additional relevant information is also gathered from members 1215 of the network, e.g., users in communication with the network 1200. The information gathered from all sources is used in the MAM's prioritization and execution policy 1203, that is, the order and manner in which the MAM processes the information and executes.

The architecture of wireless distribution system 1201 as part of a network 1200 is useful in sharing the workload of the WDS components. This structure is useful in sharing the work load of WDS component modules or units 1213 external to the MAM by utilizing the MAM's internal high processing capabilities and memory. By acting as an element of the network 1200, the multiple application module 1203 collects information relevant to the application or task at hand in several ways to follow processes and execute processes and actions, while guided by the inputs and by the prioritization and execution policies 1205. Multiple application module 1203 communicates with its internal sensors/processes/events 1207 using existing hardware and software in methodologies similar to those of a mobile user equipment. Module 1203 also consolidates requests from the users and applications within its coverage area, and also from the users and applications in the coverage area of the wireless distribution system 1201. Module 1203 accomplishes these tasks with the network of MAMs with which it is in communication, utilizing standard communication interfaces of the module.

Just as module 1203 includes a prioritization and execution policy, additional multiple application modules in the network of MAMs will include their own prioritization and execution policies, such as guidelines for assisting other modules in the network. The guidelines for the MAMs may include an overall mitigation and consolidation application based on the requests from individual users received by the individual MAMs, including module 1203. The guidelines will assist in consolidating relevant requests from the users, events and applications, even from those outside the wireless distribution system 1201 via relevant communication systems, e.g., the internet 1210. The guidelines will assist in automated correlation of the relevant information from all sources, including the Internet, with related local parameters and corresponding decision making.

Another example of such a distributed system is depicted in FIG. 13. Wireless distribution system 1300 includes a remote data center 1311 with computer-generated weather forecasts and use-of-power optimization algorithms. The center 1311 is in contact with a multiple application module 1301 which includes a plurality of apps 1303, including an application for managing an indoor temperature of a structure 1305, which may be a house, a remote data-gathering station, or an outpost not conveniently accessible to a person. In such situations, it may be important to minimize power consumption in order to extend the time between maintenance or other visits to the site. The module 1301 may be part of a user equipment in a single package, and may aim to use one or more of the communication technologies of such user equipment, e.g., enabling one or more of Wi-Fi, Bluetooth® and ZigBee® technologies and their networks with the wireless distribution system 1300. One important element in minimizing power consumption is to monitor power consumption.

In one embodiment, in the communication system as described above, the mobile application includes an instance that provides management of heat dissipation of a location, the sensor is a temperature sensor; and the multi applications processor is configured to execute the instance to provide management of heat dissipation of a location based on data from the temperature sensor.

Power consumption monitoring is important not only for the module itself, but for the processes and devices it may control or monitor. Thus, if the module itself includes a temperature sensor, at least its own temperature, a first indication of power consumption, can be monitored. The module may also be within Bluetooth® or ZigBee® range of a device or a process whose power consumption or temperature is being monitored or controlled using the module. The remote process, its temperature and its power consumption may be monitored and reported by the module. Action may be taken if the process or the temperature or the power consumption goes out-of-bounds.

In some locations, there may be no power available except for batteries, with no means available for recharging the batteries. In other locations, power may be available to operate the equipment or to recharge the battery or batteries, but it may still be desirable to minimize power consumption. One option, if power is available, is to continuously charge the stationary module 1301 with a constant power feed and to run power-hungry processes via direct electric power feed rather than utilizing the battery. Other options available may include scheduling the activation and deactivation times of the module, and if possible, timing the execution of the various processes to be performed by the module. For example, if the site is subject to time-of-day surcharges, it may be possible to schedule battery recharging at night, when rates are lower. Even if the site and the module must be active during high-surcharge times, it may be possible to re-charge when rates are lower, or when additional power is available. While charges for one site may be small, the charges, and possible savings, may be significant for a large network with a plurality of sites.

Power consumption may also be minimized by monitoring power usage and correlating with other modules in the network and by delegating the execution load to other modules via distributed process execution. It may also be possible to use "power utilization-process execution" emergent knowledge to further refine the prioritization and execution policy. It is also possible to monitor the temperature of the heat sink(s) of the module and to correlate heat dissipation trends indicated by temperature sensors of the module and its peripherals to processes running on the module. At a minimum this may be a clue to power consumption and may help to extend the battery life and the mean time between failures (MTBF) of the module itself One possible control process for monitoring power consumption is depicted in FIG. 14. The process 1400 includes a start step 1401, followed by a check 1403 on whether the prioritization execution policy has changed or whether there is a new policy. If yes, the execution policy followed by the process is updated 1404. Using the correct policy, the system asks whether charging power is available 1405 or if power is needed to operate a process or to charge a battery or other source of power. If charging power is needed and is available, the module then activates 1409 the powering system. If charging power is not available, the module then activates 1407 a back-up policy or procedure. The module also may keep track of each decision and each check on the power. As desired, the module will also report on outages of charging power and will also report when it is necessary to activate the available back-up power. Either of these circumstances may constitute an emergency for the system.

In the illustrative embodiment, the control process is for monitoring power consumption. However, it will be appreciated that similar control processes may be implanted to perform other tasks within a network. In addition, any prioritization execution policies used in connection with these processes and the frequency of their updates is a matter of design choice.

For example, another embodiment is a communication system as described above, wherein the mobile application includes an instance that provides management of signals from a base station based upon GPS coordinates, the sensor is a GPS sensor, and the multi applications processor is configured to execute the instance to provide management of signals from a base station based on data from the GPS sensor. Alternatively, position coordinates, such as GPS coordinates, for example, may be manually entered. Another embodiment is a communication system as described above, wherein the mobile application includes an instance that provides tracking of emergency equipment and the multi applications processor is configured to execute the instance to provide tracking of emergency equipment. Another embodiment is the communication system as described above, wherein the mobile application includes an instance that manages power consumption by the client device, the instance being configured to toggle a power feed to the client device between a power source and a battery.

In another embodiment, the mobile application includes an instance that: monitors a predetermined event; detects a predetermined parameter; and manages the predetermined event based upon the detected predetermined parameter In general, the multiple application modules disclosed herein are useful for sharing and extending the work load of wireless distribution systems by utilizing the high processing capabilities and memory of the modules. Smart phones are sufficiently smart that their computing and communications capabilities are underutilized. The present disclosure show how to utilize the multiple wired and wireless media connections of a mobile user equipment, such as a smart phone, to provide redundant backhaul options. Backhaul refers to the ability of a network to send data from end users to the network backbone. It may also refer to the use of wireless communications to transport data from an end user to a node in a major network, such as the Internet or a proprietary communications network, e.g., a large company, academic institution or a government agency. This enables the network to reach out and monitor quality of service (QoS) to the end user, e.g., data concerning the bit rate and bit rate errors.

This ability helps network providers to achieve network robustness by enabling multiple back-haul options on the module namely, Wi-Fi, Bluetooth®, ZigBee® and the cellular network of the mobile user equipment. Useful connectors may include a USB-to-fiber connector, or a micro-USB-to-fiber, or other connector, in order to use the module's USB or similar communication port. The backhaul application on a multiple application module continuously monitors different backhauls and routes traffic via the best option as guided by the "priority and execution policy" discussed above, and routes the traffic accordingly. This capability can help carriers to maintain a high quality of service to end users who previously did not have an available backhaul route.

Other uses also attach to the modules disclosed herein. Depending on the needs of the users for a (stationary) multiple equipment module, a part of the hardware and software may be modified or added to enable or to add non-mobile applications. These may include emulation and simulation, e.g., mobility, using the GPS sensing and location sensing capabilities of the module. Another example may be leveraging GPS sensor-generated x, y, z coordinates of the module or similar x, y, z coordinates. In this example, either system-generated or manual entry of a location may be used to locate other multiple application modules, multiple application units and the wireless distribution system components they are associated with. This information may be used for context generation and communication.

As discussed above, using GPS sensors and having an ability to locate a given device or multiple application module in real time is of course useful in delivering location-based services. A service provider may be identified and a better service provider may be located using automatic SSID (service set identifier) identification and coding. Multiple application modules may include multiple wireless interfaces for hosting a plurality of location-based services. The multiple application modules of the present disclosure will unobtrusively collect user equipment (module) location information, e.g., the x, y, z coordinates mentioned above, from one or more location-based services running on the module(s).

Figure 15:
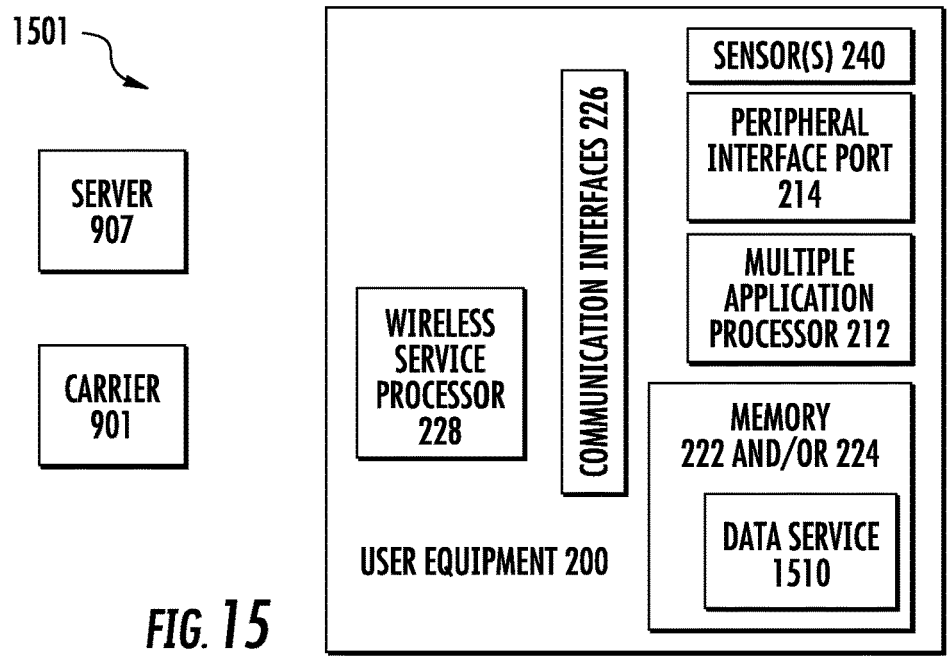
FIG. 15 is an exemplary network optimization device in the form factor of the FIG. 2A client device according to this disclosure depicting a data service in either internal or external memory.

This may also be useful in enabling correlation or tracking of one or more carriers that provide service to the system. Present mobile user equipment is able to receive telephone calls from multiple carriers and connect with multiple carriers in making calls. Using this technology as a stationary multiple application module or a mobile multiple application unit, its GPS locating capability enables carrier correlation with user location. Thus, user equipment performance to a remote wireless distribution system can be quantified. It is also possible to adjust the performance of the wireless distribution system using industry standards that apply to user equipment, such as smart phones. These adjustments may use industry-standard communication protocols and industry-standard communication interfaces. By enabling access to different communication media supported by the multiple application module, a carrier or provider can utilize built-in redundancy to control the wireless distribution system and the downstream distributed antenna system (DAS). FIG. 15 shows a network optimization device 1501 in the form factor of the FIG. 2A client device according to this disclosure depicting a data service in either internal or external memory. More specifically, the network optimization device 1501 comprises a user equipment 200 comprising a multiple application processor 212, a wireless service processor 228, a memory 222 or a memory 224 (or both memories 222 and 224), a peripheral interface port 214, and a sensor 240. Each of the multiple application processor 212, the wireless service processor 228, the peripheral interface port 214, and the sensor 240 communicate data over a communication interface 226. Each of the multiple application processor 212, the wireless service processor 228, the peripheral interface port 214, the sensor 240, and the communication interface 226 have the same function and operation as described in connection with FIG. 2A above. The multiple application processor 212 is configured to execute an instance of a data service 1510 which in FIG. 15 is shown residing in either internal memory 22 or external memory illustratively connected to the user equipment 200 through peripheral interface port 214.

Figure 16:
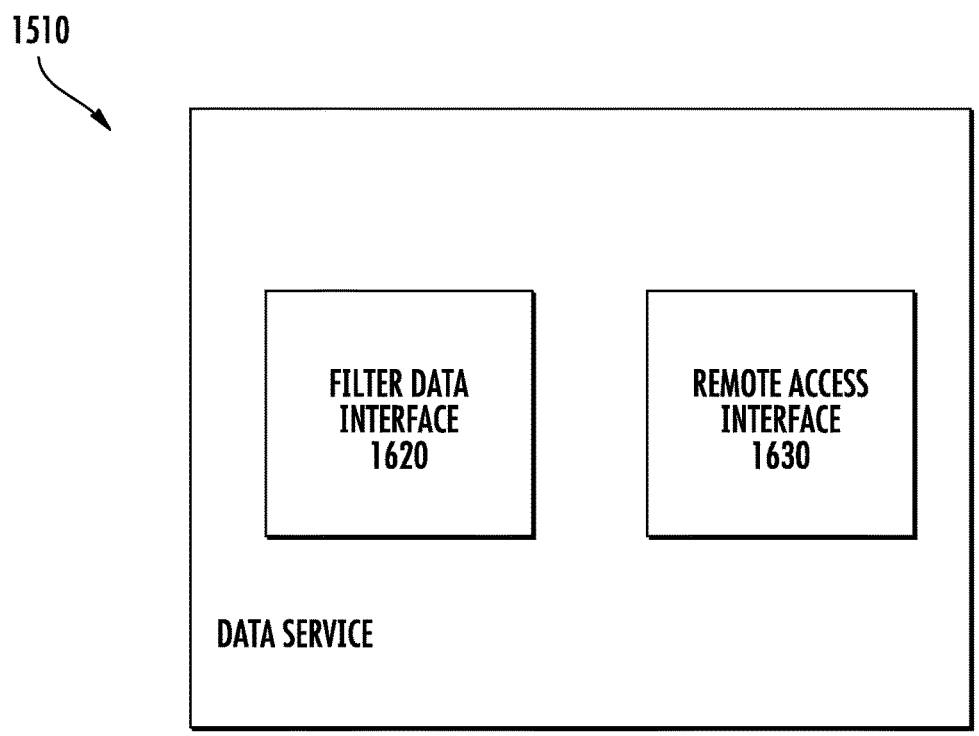
FIG. 16 is the data service depicted in FIG. 15 illustrating a filter data interface and a remote access interface features of another embodiment of this disclosure.

FIG. 16 is the data service 1510 depicted in FIG. 15 illustrating a filter data interface 1620 and a remote access interface 1630 embodiment of this disclosure. The filter data interface 1620 is configured to filter data that is sent and received across the communication interface 226 by selectively acquiring user equipment data related to network performance. The second interface 1630 is configured to allow remote access to the selected network performance data. Hence, in this embodiment, the multiple application processor 212 is configured to execute the instance of a data service 1510 to advantageously establish: a first interface configured to filter data that is sent and received across the communication interface 226 by selectively acquiring user equipment data related to network performance, and a second interface configured to allow remote access to the selected network performance data.

In another embodiment, the first interface is further configured to store the selected network performance in the memory 222 and/or 224 and the second interface is further configured to allow remote access to the selected network performance data stored in the memory.

The selected network performance data acquired by the first interface 1620 illustratively includes data on a signal that may indicate Quality of Service (QoS). For example, the data may include data on the band on which the user equipment 200 is operating. The data may include signal strength, signal quality, bit rate and bit error rate of the signal. The data may also include data on other signals that the user equipment 200 may scan when tuning to a channel for communication. The data to be selected may be determined by a carrier, a provider, a third party, or the like.

The remote access interface 1630 may include remote access user configuration data associated with the user equipment 200. The remote access user configuration data restricts users who may remotely access the selected network performance data to authorized users, such as a service carrier, a provider, or other authorized parties. Illustratively, the configuration data may be set in the user equipment at the point of sale of the user equipment. For example, a user may agree to have such configuration data programmed into the user equipment as part of a contract for service. Alternatively, a user may download an application for the data service and set user permissions for remote access as part of the download, registration, and/or during use of the application. In this and other ways, the remote access interface 1630 manages data traffic it allows to the user equipment.

Remote access to the selected network performance data may be wirelessly via the wireless service processor 228. Alternatively, the remote access to the selected network performance data may be via the peripheral interface port 214.

Figure 17:
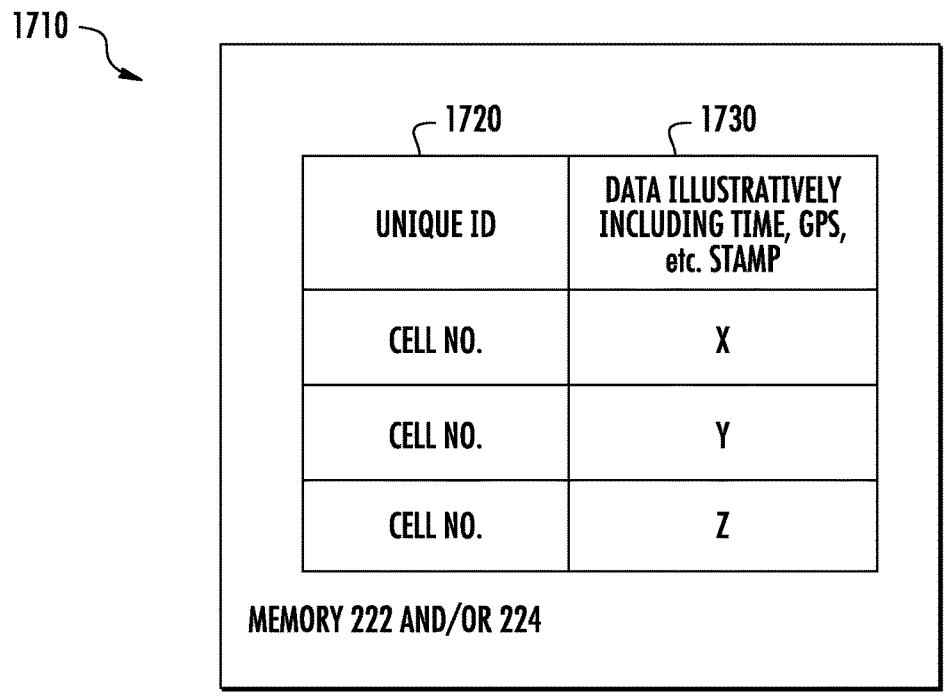
FIG. 17 is an exemplary registry of data filtered by the filter data interface of FIG. 16 and stored in memory with a unique ID according to another embodiment of this disclosure.

In the embodiment wherein the first interface is further configured to store the selected network performance in the memory 222 and/or 224 and the second interface is further configured to allow remote access to the selected network performance data stored in the memory, it is advantageous for the stored data to be correlated to the user equipment. FIG. 17 shows a registry 1710 of data 1730 filtered by the filter data interface of FIG. 16 and stored in memory 222 and/or 224 with a unique ID 1720 according to this disclosure. In the illustrative example, the unique ID 1720 is depicted as a cell number of the user equipment. Alternatively, the unique identifier may be a cell number, an identifier of a base station tower providing cell service to the user equipment, identifiers of base station towers in communication with the user equipment, an identifier of a wireless access point address providing wireless service to the user equipment, a GPS location, the like, and a combination thereof.

Advantageously, the unique identifier associates the network performance data to some attribute of the user equipment which may be the user equipment itself, a GPS location, a base station tower, or some other network parameter that defines the user equipment at the point of the acquired data. Any data that is remotely exported from the user equipment may carry an origination stamp of the user equipment such as the cell number of the user equipment. Alternatively, the data may carry an origination stamp of a GPS location, a base station tower, an access point, or some other attribute that the data is associated with. Any combination of these or other origination stamps may be associated with the data to allow the network to better manage exported data taken from a network of user equipment.

Figure 18:
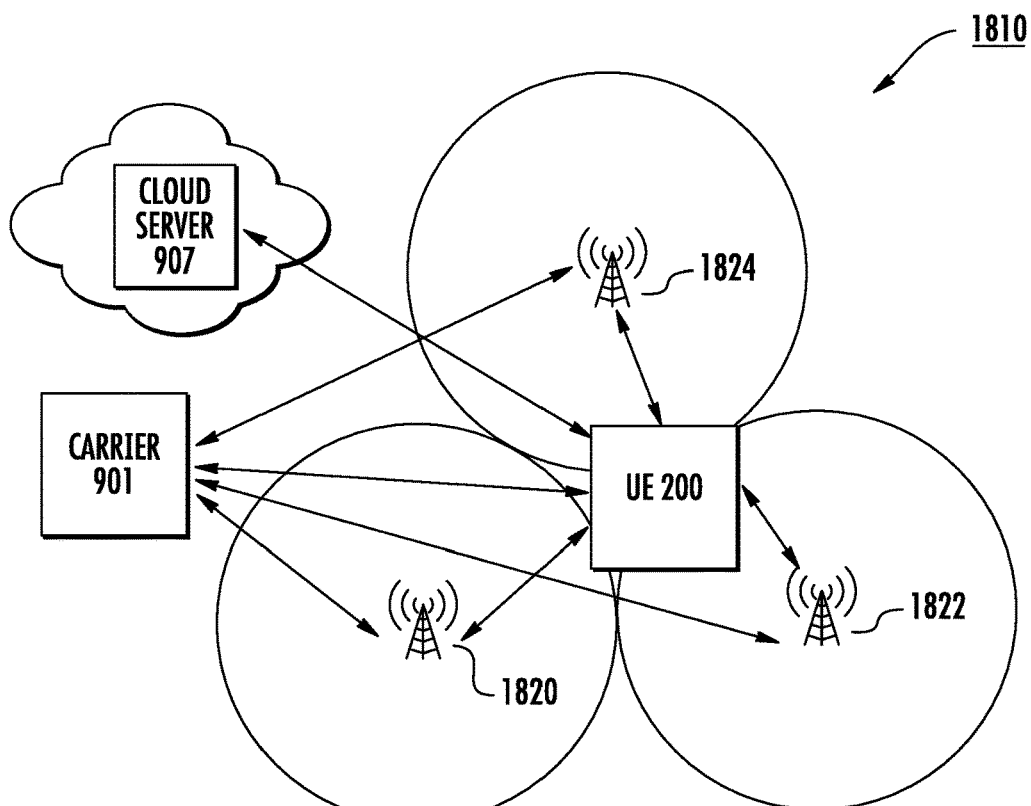
FIG. 18 is an illustrative exemplary embodiment of the use of the client device of FIG. 15 to optimize a network of base stations.

FIG. 18 is an illustrative embodiment of the use of the client device of FIG. 15 to optimize a network of base stations. FIG. 18 depicts a network 1810 comprising a group of base stations 1820, 1822, 1824; a carrier 901, a cloud server 907, and a user equipment 200. The base stations 1820, 1822, 1824; the carrier 901, the cloud server 907, and the user equipment 200 operate in a manner previously described with the user equipment 200 operating according to the embodiment disclosed in FIGS. 15 and 16. The carrier 901 is shown illustratively communicating with the base stations and the user equipment 200. The carrier 901 may also communicate with the user equipment using the cloud server 907. In this instance, the carrier 901 may also communicate with the cloud server 907. Alternatively, cloud server 907 may be operated by a third party that the user equipment 200 has granted remote access to the selected data through the remote access interface 1630 of selected network performance data acquired by the first interface 1620. As shown in FIG. 18, the user equipment 200 may also communicate with the base stations, the carrier 901, and the cloud server 907.

To enable the functionality described, the instance of the data service configured with the first interface and the second interface would need to be downloaded onto the user equipment. As previously explained, the instance may come with the user equipment on purchase or be downloaded to the user equipment at a later time. In addition, remote access permission configurations may illustratively be set at the point of sale or subsequently as part of the download installation or operation of the application.

When the utility equipment 200 is operating, data is sent and received across the communication interface 226. As shown in FIG. 18, the data on which the first data interface 1620 operates may be sent and received across the communication interface 226 directly from the base stations, the carrier 901, and/or the cloud server 907. Alternatively, the data sent and received across the communication interface 226 may come from the sensors 240, the peripheral interface port 214, the multiple application processor 212, the memory 22 and/or 224, the wireless service processor 228, and/or a combination of these. In either case, the first data interface 1620 is configured to selectively acquire user equipment data related to the network performance. The specific user equipment data may be specified by the carrier 901, the cloud server 907, and the like. The data acquired by the first data interface 1620 may be stored in the memory 222 and/or 224.

The second interface 1630 provides the remote access to the acquired network performance data by either the carrier 901 or the cloud server 907 in this illustrative embodiment provided that the carrier 901 and the cloud server 907 have the permissions required by the user equipment configuration data to remotely access the acquired network performance data.

Access by the carrier 901 or the cloud server 907 or through the peripheral interface port 214 may occur in real time. The remote access may occur by polling the user equipment. For example, the remote wireless access may occur by polling of the second interface by the server. The polling of the second interface by the server may occur at a predetermined period of time.

In addition, the second interface may be further configured to provide a scheduled uploading of the selected network performance data stored in the memory to the server. Further, the second interface may be configured to download from the server updates to the second interface. Moreover, the second interface or another instance may be configured to install the downloaded updates on the user equipment.

Figure 19:
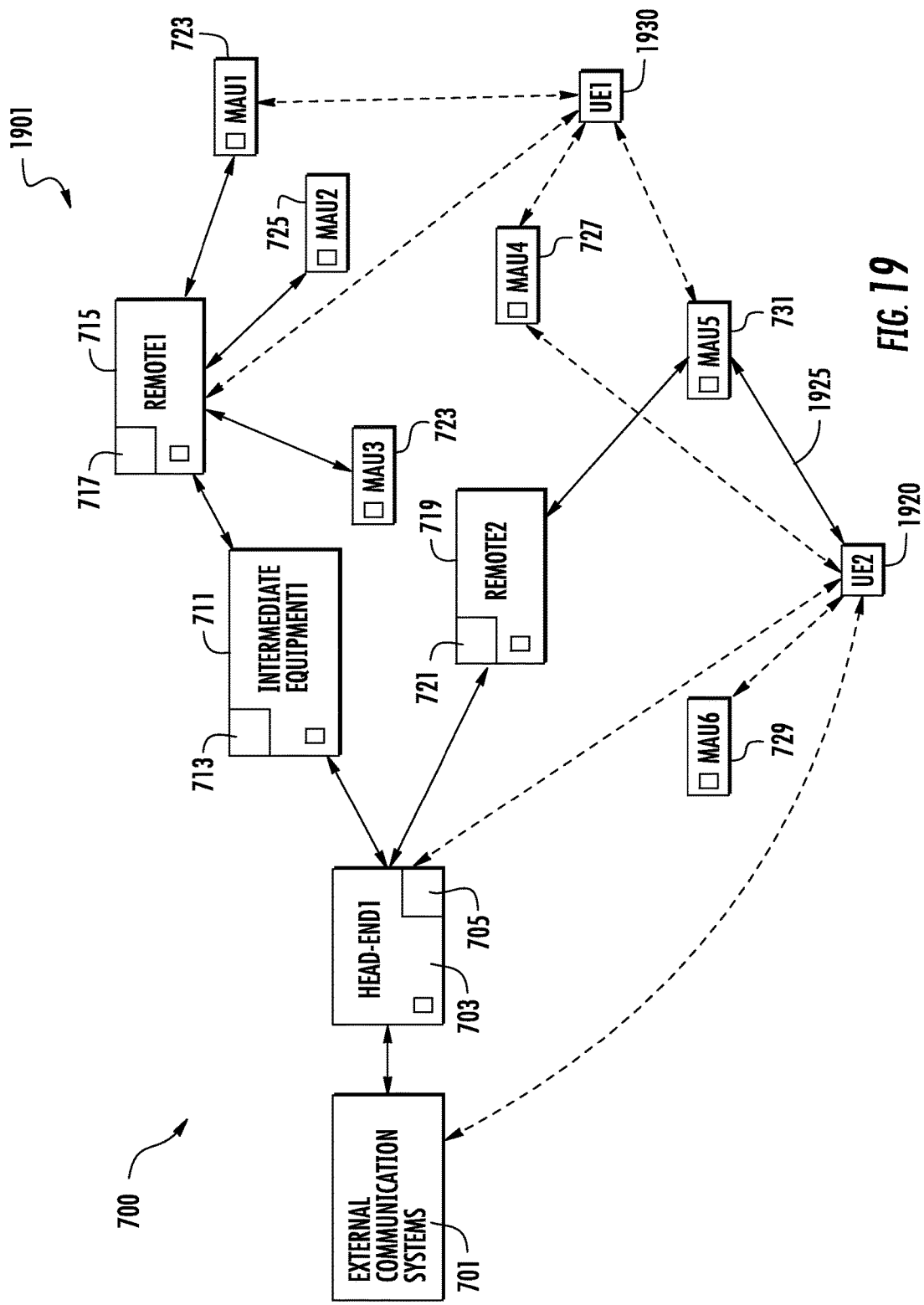
FIG. 19 is the FIG. 7 architecture of an illustrative wireless distribution system (WDS) illustrating the use of the client device of FIG. 15 to optimize the wireless distribution system.

FIG. 19 shows the FIG. 7 architecture of an illustrative wireless distribution system (WDS) illustrating the use of the client device of FIG. 15 to optimize the wireless distribution system. More specifically, FIG. 19 shows a wireless distribution system comprising head-end equipment 703 including one or more MAMs 705, intermediate equipment 711 (which may include an OIU not shown) including a MAM 713; remote units 715, 719 including MAMs 717, 721; intermediate equipment 711 including MAM 713, a plurality of MAUs 723, 725, 727, 729, 731; and user equipment 1920, 1930 with the data service configured with the first interface 1620 and the second interface 1630 of this disclosure.

As shown in FIG. 19, each of user equipment 1920 and 1930 may be in communication with one or more of the foregoing components of the network. Data sent and received from these network devices across the communication interface 226 and data sent and received from the sensors 250, peripheral interface port 214, multiple application processor 212, memory 222 and/or 224, and/or wireless service processor 228 across the communication interface 226 may be operated on by the first interface 1620 of this disclosure to acquire user equipment data related to network performance. Further, any one or more of these components may remotely access the selected network data acquired by the user equipment through the second interface 1630 of this disclosure provided that they have the permissions required by the user device to do so.

In one illustrative embodiment, user equipment 1920 is communicating wirelessly with the network as shown by communication links depicted in dashed line in FIG. 19. Alternatively, user equipment 1920 may use a wired connection to communicate with the network, as shown by communication link 1925. For example, user equipment 1920 and MAU 731 may transfer data over a USB cable connected between them.

Figure 20:
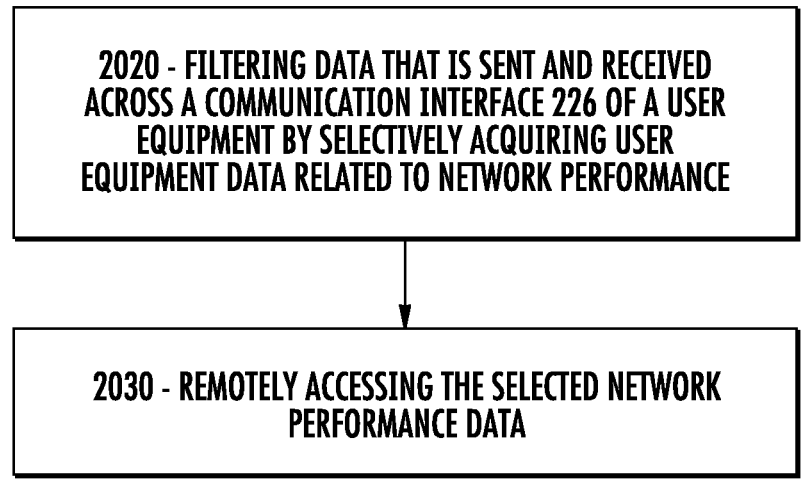
FIGS. 20 and 21 are illustrative exemplary methods for using the client device of FIG. 15.
Figure 21:
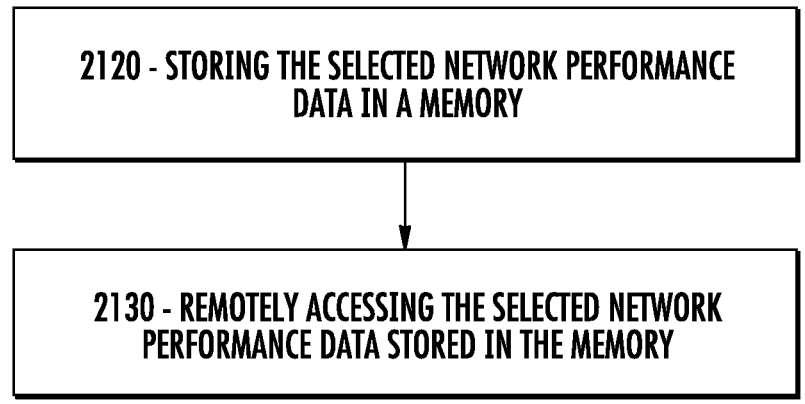

FIGS. 20 and 21 are illustrative methods for using the client device of FIGS. 15 and 16. FIG. 20 shows a method 2001 for optimizing a network. Data that is sent and received across a communication interface 226 is filtered 2020 to selectively acquire user equipment data related to network performance. The selected network performance data is then remotely accessed 2030.

In FIG. 21, the illustrative method 2101 includes storing 2120 selected performance data in a memory; and the selected network performance data stored in the memory is remotely accessed 2130.

In either and other examples, the selected network performance data may include data on a signal that may indicate Quality of Service (QoS). For example, the data may include data on the band on which the user equipment 200 is operating. The data may include signal strength, signal quality, bit rate and bit error rate of the signal. The data may also include data on other signals that the user equipment 200 may scan when tuning to a channel for communication. The data to be selected may be determined by a carrier, a provider, a third party, or the like.

In either and other examples, remote access of the selected network performance data may be wirelessly via a wireless service processor. Alternatively, the remote access may be via wire using the peripheral interface port 214.

Figure 22:
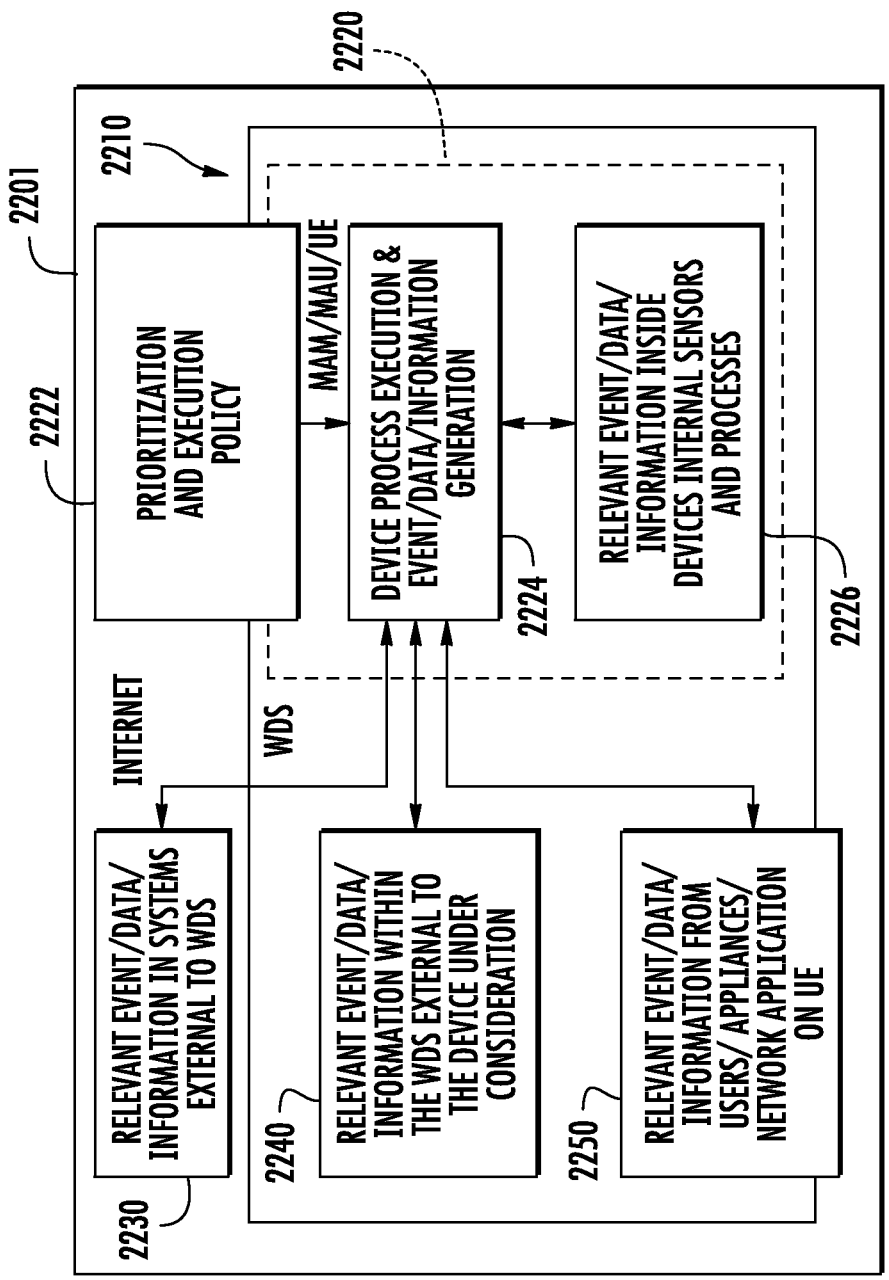
FIG. 22 depicts an exemplary network including a wireless distribution system (WDS) 2210 according to an embodiment of this disclosure.

FIG. 22 depicts a wireless distribution system (WDS) 2210 according to this disclosure comprising a plurality of devices 2220. Each of devices 2220 in wireless distribution system (WDS) 2210 may be a multiple application module (MAM), a multiple application unit (MAU), or a user equipment (UE). The devices may be distributed throughout the wireless distribution system (WDS) 2210 as shown in FIG. 19. As shown in FIG. 22, the devices may be provided with process execution instructions 2224 to perform processes for optimizing a network system such as previously explained in connection with FIG. 14. The devices may generate relevant event, data, and other information 2226 that may be used by the wireless distribution system (WDS) 2210. The devices 2220 may access or be provided by relevant event, data, and other information 2250 from users, appliances, and/or network applications running on a user equipment. The devices 2220 may access or be provided with relevant event, data, information 2240 from other devices (e.g., other multiple application module(s) (MAM), multiple application unit(s) (MAU), or user equipment(s) (UE) in the wireless distribution system (WDS) 2210. The devices 2220 may also access or be provided with relevant event, data, information 2230 from other networks (not shown). The teachings of this disclosure allow for data and information from within wireless distribution system (WDS) 2210 and from outside wireless distribution system (WDS) 2210 to be used to optimize the performance of wireless distribution system (WDS) 2210.

There is thus described a communication system according to this disclosure includes a computing device configured to serve as a client device to a wireless distribution system (WDS) includes a memory; a multiple applications processor in communication with the memory and configured to execute one or more mobile applications; and a wireless service processor in communication with the multi applications processor for communicating via a corresponding wireless service with the wireless distribution system (WDS). The multi applications processor is configured to execute an instance of a data service to establish a connection with the wireless distribution system (WDS) for a specified application process utilizing the wireless service to provide at least one datum on the wireless distribution system (WDS). In the method, an instance of a data service is executed to establish a connection with a wireless distribution system (WDS) for a specified application process utilizing a wireless service to provide at least one datum on the wireless distribution system (WDS).

One embodiment is a network optimization device. The device includes a user equipment including a multiple application processor, a wireless service processor, a memory, a peripheral interface port, and a sensor; each of the multiple application processor, the wireless service processor, the peripheral interface port, and the sensor communicating data over a communication interface and the multiple application processor being configured to execute an instance of a data service. The device also includes a first interface configured to filter data that is sent and received across the communication interface by selectively acquiring user equipment data related to network performance, and a second interface configured to allow remote access to the selected network performance data.

Another embodiment is a method for optimizing a network, the method including filtering data that is sent and received across a communication interface of a user equipment by selectively acquiring user equipment data related to network performance and remotely accessing the selected network performance data. In one embodiment, the method also includes storing the selected network performance data in a memory and remotely accessing the selected network performance data stored in the memory.

The wireless service may be selected from the group consisting of cellular, Wi-Fi, RFID, Satellite, Bluetooth, and ZigBee. The wireless service may be selected from the group consisting of Wi-Fi, Bluetooth, Ethernet, DSL, LTE, Wireless Access Points (WAPs), PCS, 2G, 3G, 4G, Remote Radio Heads (RRH), Radio over Fiber Optic Cable (RoF), WiMax, LAN, CDMA, TDMA, GSM, WDM and WLAN, Satellite, RFID, Bluetooth, ZigBee, NFC (near field communication), and Wi-Gig. The wireless service may Wi-Fi, and the client device may be configured to operate as a Wi-Fi access point. The mobile application may be selected from the group consisting of call reception, call origination, Short Message Service (SMS) texting, Instant Messaging (IM), a data application, an email application, a word processing application, a camera application, a presence application, gaming application, a music playback application, a video playback application, a social media application, a voice command mode, and a hands-free mode.

The client device may include an external memory interface configured to interface external memory to the client device. The client device may include a peripheral interface port configured to interface a peripheral device to the client device. The client device may include a physical communication port configured to allow a physical connection to the client device. The physical communication port may be a PoE+ port. The client device may include a sensor configured to detect a physical property. The sensor may be selected from the group consisting of a temperature sensor, an accelerometer, a compass, a gyro, a proximity, and a light sensor.

The mobile application may include an instance that provides management of heat dissipation of a location, the sensor may be a temperature sensor, and the multi applications processor may be configured to execute the instance to provide management of heat dissipation of a location based on data from the temperature sensor. The mobile application may include an instance that provides management of signals from a base station based upon GPS coordinates, the sensor may be a GPS sensor, and the multi applications processor may be configured to execute the instance to provide management of signals from a base station based on data from the GPS sensor. The mobile application may include an instance that provides tracking of emergency equipment, and the multi applications processor is configured to execute the instance to provide tracking of emergency equipment. The mobile application may include an instance that manages power consumption by the client device, and the instance may be configured to toggle a power feed to the client device between a power source and a battery.

In a communication system including a wireless distribution system (WDS) configured for transmitting a downlink signal or for receiving an uplink signal, the computing device may be configured to serve as a client device to the wireless distribution system (WDS). The client device includes a memory, a multiple applications processor in communication with the memory, and a wireless service processor in communication with the multi applications processor for communicating via a corresponding wireless service with the wireless distribution system (WDS). The multi applications processor may be configured to execute an instance of a data service to establish a connection with the wireless distribution system (WDS) for a specified application process utilizing the wireless service to provide at least one datum on the wireless distribution system (WDS).

The wireless service may be selected from the group consisting of cellular, Wi-Fi, RFID, Satellite, Bluetooth, and ZigBee. The wireless service may be selected from the group consisting of Wi-Fi, Bluetooth, Ethernet, DSL, LTE, Wireless Access Points (WAPs), PCS, 2G, 3G, 4G, Remote Radio Heads (RRH), Radio over Fiber Optic Cable (RoF), WiMax, LAN, CDMA, TDMA, GSM, WDM and WLAN. The wireless service may be Wi-Fi, and the client device may be configured to operate as a Wi-Fi access point. The mobile application may be selected from the group consisting of call reception, call origination, Short Message Service (SMS) texting, Instant Messaging (IM), a data application, an email application, a word processing application, a camera application, a presence application, gaming application, a music playback application, a video playback application, a social media application, a voice command mode, and a hands-free mode.

The wireless distribution system (WDS) may include a head end unit (HEU) and the client device may reside in the head end unit (HEU). The at least one datum may be a quality of service metric on the downlink signal or the uplink signal handled by the head end unit (HEU). The wireless distribution system (WDS) may include a remote antenna unit (RAU), also known as a remote unit (RU). The client device may reside in the remote antenna unit (RAU) or remote unit (RU). The at least one datum may be a quality of service metric on the downlink signal or the uplink signal handled by the remote antenna unit (RAU). The client device may share the workload of the remote antenna unit (RAU).

The wireless distribution system (WDS) may include a head end unit (HEU). The client device may reside in the head end unit (HEU). The client device may provide a first client device to the system, the data service of the first client device providing a first data service. The at least one datum may provide a first at least one datum, the first at least one datum being a quality of service metric on the downlink signal or the uplink signal handled by the head end unit (HEU). The wireless distribution system (WDS) may further include a remote antenna unit (RAU). A second client device may reside in the remote antenna unit (RAU). The second client device may provide a second data service that provides the wireless distribution system (WDS) with a second at least one datum on the transmitted downlink signal or the received uplink signal of the wireless distribution system (WDS). The second at least one datum may be a quality of service metric on the downlink signal or the uplink signal handled by the remote antenna unit (RAU). The first datum on metrics and the second datum on metrics may be correlated to correlate the downlink signal or the uplink signal handled by the head end unit (HEU) to the downlink signal or the uplink signal handled by the remote antenna unit (RAU).

The wireless distribution system (WDS) may include a base station. The client device may be configured to scan bands available from the base station and determine a quality of service of a scanned band of frequencies. The quality of service may be the power level of a scanned band of frequencies. The client device may be configured as a first client device and the system may further include a second client device. The first client device may be configured to serve as a master to the second client device.

The communication system may include a server. The client device may communicate the at least one datum on the transmitted downlink signal or the received uplink signal of the wireless distribution system (WDS) to the server. The client device may include an external memory interface configured to interface external memory to the client device. The external memory may illustratively be a hard drive memory in communication with the client device. The hard drive memory may reside near the client device or remotely. In another illustrative embodiment, the external memory is a memory unit residing in the cloud and accessibly by the client device such as over the internet. By the term "cloud" is meant a wide area network (WAN), such as the public Internet or a private, national or global network or a local area network (LAN) within an organization.

The client device may include a peripheral interface port configured to interface a peripheral device to the client device. The client device may include a physical communication port configured to allow a physical connection to the client device. The physical communication port may be a PoE+ port. The physical communication port may be a PoE+ port on the client device and the PoE+ may be connected via GEM to the PoE+ on the remote antenna unit (RAU) or remote unit (RU).

The client device may include a sensor configured to detect a physical property. The sensor may be selected from the group consisting of a temperature sensor, an accelerometer, a compass, a gyro, a proximity, and a light sensor.

The mobile application may include an instance that provides management of heat dissipation of a location. The sensor may be a temperature sensor and the multi applications processor may be configured to execute the instance to provide management of heat dissipation of a location based on data from the temperature sensor. The mobile application may include an instance that provides management of signals from a base station based upon GPS coordinates. The sensor may be a GPS sensor and the multi applications processor may be configured to execute the instance to provide management of signals from a base station based on data from the GPS sensor. The mobile application includes an instance that provides tracking of emergency equipment and the multi applications processor may be configured to execute the instance to provide tracking of emergency equipment. The mobile application may include an instance that manages power consumption by the client device and the instance may be configured to toggle a power feed to the client device between a power source and a battery.

An illustrative method for communicating with a network may include the steps of calling a client; establishing a communication link with a data service of the client device; providing a specified application process number to the data service; requesting the data service to establish connection with the network for the specified application process number. The method may further include the steps of: determining whether the data service is available to do the task; putting the request into the queue of an inbox if the data service is unavailable to do the task for processing at such time that the data service is available to do the task. The method may further include the steps of: establishing a connection with the network; and performing the specified application process number requested by the provider. The method may further include the steps of: collecting data that is called for by the specified application process number; and reporting the collected data in real time. The method may further include the steps of: collecting data that is called for by the specified application process number; and putting the collected data into an outbox for retrieval at a later point in time.

In an alternative illustrative communication method according to this disclosure a downlink signal is transmitted or an uplink signal is received in a wireless distribution system (WDS). There is a communication via a wireless service with the wireless distribution system (WDS). A mobile application is executed to provide a data service utilizing the wireless service that provides the wireless distribution system (WDS) with at least one datum on the transmitted downlink signal or the received uplink signal of the wireless distribution system (WDS). The at least one datum is communicated to the wireless distribution system (WDS).

The wireless service may be selected from the group consisting of cellular, Wi-Fi, RFID, Satellite, Bluetooth®, and ZigBee®. The wireless service may be selected from the group consisting of Wi-Fi, Bluetooth®, Ethernet, DSL, LTE, Wireless Access Points (WAPs), PCS, 2G, 3G, 4G, Remote Radio Heads (RRH), Radio over Fiber Optic Cable (RoF), WiMax, LAN, CDMA, TDMA, GSM, WDM and WLAN. The wireless service is Wi-Fi, and the data service may provide a Wi-Fi access point. The mobile application may be selected from the group consisting of call reception, call origination, Short Message Service (SMS) texting, Instant Messaging (IM), a data application, an email application, a word processing application, a camera application, a presence application, gaming application, a music playback application, a video playback application, a social media application, a voice command mode, and a hands-free mode.

In an illustrative embodiment, the wireless distribution system (WDS) may include a head end unit (HEU) and the at least one datum may be a quality of service metric on the downlink signal or the uplink signal handled by the head end unit (HEU). The wireless distribution system (WDS) may include a remote antenna unit (RAU); and the at least one datum may be a quality of service metric on the downlink signal or the uplink signal handled by the remote antenna unit (RAU).

The method may further include the step of sharing the workload of the remote antenna unit (RAU) between the remote antenna unit (RAU) and the data service.

The wireless distribution system (WDS) may include a head end unit (HEU). The wireless distribution system (WDS) may further include a remote antenna unit (RAU). The at least one datum may be a quality of service metric on the downlink signal or the uplink signal handled by one of either the head end unit (HEU) or the remote antenna unit (RAU), the at least one datum of quality of service providing a first quality of service metric. The mobile application or another mobile application may be executed to provide a second at least one datum on the transmitted downlink signal or the received uplink signal handled by the other of either the head end unit (HEU) or the remote antenna unit (RAU), the second at least one datum of quality of service providing a second quality of service metric. The first quality of service metric and the second quality of service metric may be correlated for correlation of the downlink signal or the uplink signal handled by the head end unit (HEU) to the downlink signal or the uplink signal handled by the remote antenna unit (RAU).

In the method, the wireless distribution system (WDS) may include a base station. The bands of frequencies being transmitted by the base station may be scanned; and a quality of service of a scanned band of frequencies may be determined. The quality of service may be the power level of the scanned band of frequencies.

In another illustrative method, the data service may provide a first data service. A second data service may be provided. The first data service may be provided as a master to the second data device. The at least one datum may be communicated on the transmitted downlink signal or the received uplink signal of the wireless distribution system (WDS) to a server. The data service may be provided with an external memory. The data service may be interfaced to a peripheral device. A physical connection may be provided to the data service. The physical connection may be a PoE+ port. The physical connection may be a PoE+ port via GEM on a remote antenna unit (RAU).

A physical property may be detected by a sensor for use by the mobile application. An instance may be provided to provide management of heat dissipation of a location and management of heat dissipation of a location based on data from a temperature sensor may be provided. An instance may be provided that provides management of signals from a base station based upon GPS coordinates; and management of signals from a base station based on data from a GPS sensor may be provided. An instance may be provided that provides tracking of emergency equipment; and tracking of emergency equipment may be provided. An instance may be provided that provides management of power consumption by the client device; and the instance may be configured to toggle a power feed to the client device between a power source and a battery.

The MAM and MAU of this disclosure provide many advantages. Power management using UE or like architecture may (i) minimize electric/battery power consumption, (ii) allow for power usage monitoring and mitigation using distributed process execution, (iii) allow for process optimization on observed power-process relation, (iv) allow utilization of charged battery for emergency applications such as 911/fire response systems. Heat may be managed such as by heat dissipation management by correlation of temperature sensors, for example, of the MAM and MAU to processes running on the MAM and MAU thereby using UE or like architecture HW for industrial application. Simplified mechanics and interfaces such as by flexible mounting and heat dissipation capabilities of the MAM and MAU allow future versions of the UE or like architecture HW to be readily supported. For example, future versions of the user equipment or like equipment multi-radio/application/interface/sensor circuitry with different form factors, communication and antenna interfaces may be readily supported and incorporated in to the same mechanical chassis of the MAM or MAU. External ports on the MAM or MAU may be design standard while internal interfaces to the user equipment or like equipment may be kept flexible to support WDS specific $3^{rd}$ party application vendor ecosystem development.

Antenna radiation UE or like architecture may be optimized on the mounting. A MAM in an RAU may share the workload of the RAU. The MAM may also provide additional memory if required by the RAU. The MAM on a gigabit Ethernet module (GEM) may utilize PoE+ of one of the GEM ports. The MAM may utilize the available bandwidth of one of the GEM ports.

Using the operating system and the software development kit of a UE or like architecture (i) may allow personal app developers to more easily develop WDS applications using known methods, (ii) may allow the large pool of application developers to be leveraged to develop WDS applications using known methods (iii) may allow for centralized application software to be automatically generated or developed to adopt to the applications in the MAMs, (iv) may allow head-end or centralized server side to be automatically updated to the applications in the MAMs and MAUs. (iv) and allows leverage of existing applications. UE or like architecture may be easily scalable. For example, the network may be extended by deploying MAMs or MAUs beyond the RAU in the coverage area and wirelessly networking back to the MAM in the RAU. MAMs and MAUs can be configured as a client or master and clients may automatically detects MAMs in the vicinity using different optional media and configure/change configuration accordingly The MAMs and MAUs may allow automated correlation with the information on the network and related indoor parameters. Decision making based on the correlations may enable proactive actions rather than reactive actions. MAMs and MAUs may provide a Wi-Fi hotspot. The Wi-Fi hotspot may be used to create machine-to-machine network communications between MAMs and MAUs wired to the WDS and those MAMs and MAUs that are wirelessly connected to extend the WDS network. The Wi-Fi hotspot may enable a wired backhaul with better backhaul bandwidth capabilities. Networking capabilities beyond the typical cellular backhaul Wi-Fi hotspot may be achieved. Applications running on the MAM and MAU may change to different SSIDs to communicate with different clients and networks. An MAM and MAU may switch from hotspot configuration to client and vice versa to enable different communications, as well as simultaneous communications. The cellular backhaul of the MAM for Wi-Fi hotspot may be changed using applications running on the MAM.

Wi-Fi offload may be possible using the MAM and MAU of this disclosure such as by (i) enabling a MAM of MAU to connect to IP network via GEM and CEU; (ii) continuously monitoring QoS of the link to IP network, Wi-Fi connection between the MAM in the RAU and the extensions by test calls; and (iii) communicating call metrics with a Wi-Fi offload server GPS enabled location context may be possible using the MAM and MAU of this disclosure such as by (i) using a GPS sensor of the UE or like architecture may self-locate better when stationary; providing accuracy value and confidence value; (ii) use of an application to insert the GPS coordinates in case of weaker GPS signal; (iii) correlation of WDS events with the GPS coordinates of the WDS components; (iv) correlation of WDS events with the GPS coordinates of the WDS components and with UE or like architecture of the MAM or MAU; (v) seamless switching between indoor and outdoor GPS navigation system made possible with UE or like architecture of the MAM or MAU; (vi) real-time regional monitoring of the WDS from a remote centralized operation center Location based services may be possible using the MAM and MAU of this disclosure such as by (i) automatic SSID coding of the UE or like architecture with GPS location; (ii) using the multiple wireless interfaces of the UE or like architecture to host multiple location based service applications; (iii) collecting UE or like architecture location information from different location based services applications running on the UE or like architecture without infringing privacy (#,x,y,z,t); (iv) using the collected the UE or like architecture information for system centered location based system applications.

Auto-dynamic capacity steering may be possible using the MAM and MAU of this disclosure such as by (i) utilizing UE or like architecture equipment location information to inform UE or like architecture density against cells to ONE; (ii) ONE configuring additional services to the cells with significantly large user density.

Flexible multiple backhaul options may be possible using the MAM and MAU of this disclosure such as by (i) by using the micro-USB or similar wired interface port of the UE or like architecture, the MAM and MAU can enable Wi-Fi, Bluetooth, and Cellular and including USE-to-Ethernet; (ii) these different interfaces may act as optional, simultaneous backhaul options.

Digital commissioning may be possible using the MAM and MAU of this disclosure such as by (i) by incorporating MAMs both at the head-end and RAU the input and output power levels of the cellular service in order to correlate power levels accurately; (ii) simultaneous commissioning by MAMs in the HEU and RAU with live signal Digital Spectrum monitoring and optimization may be possible using the MAM and MAU of this disclosure such as by (i) running an application on the UE or like architecture that keeps the device in scanning mode to collect available bands and the quality parameters of the available services; (ii) the collected information such as CPICH and similar information may be used for SON applications and MACRO seepage info and adjustment.

Carrier control may be possible using the MAM and MAU of this disclosure such as by (i) being stationary and having a GPS location, the MAM and MAU enables carrier correlation UE performance to WDS RAU and to adjust the WDS performance via commands sent to MAM using industry-standard communication protocols and industry-standard communication interfaces; (ii) by enabling access to different communication media supported by MAM or MAU, a carrier can utilize built-in redundancy to control the DAS.

Public safety may be possible using the MAM and MAU of this disclosure such as by (i) locating the whereabouts of emergency equipment near; (ii) by consolidation of multiple calls on the same event; and (iii) by public safety policy implementations possible using the applications on the MAM and MAU.

The embodiments disclosed herein are also applicable to other remote antenna clusters and distributed antenna systems, including those that include other forms of communications media for distribution of communications signals, including electrical conductors and wireless transmission. The embodiments disclosed herein may also be applicable to remote antenna clusters and distributed antenna systems and may also include more than one communications media for distribution of communications signals (e.g., digital data services, RF communications services).

In general, this disclosure concerns using existing mobile user equipment capabilities for stationary non-user (mobile) equipment applications. For example, many multiple location based services support multiple wireless interfaces and or multiple network densities, such as digital system commissioning and configuration, multiple use case scenario simulation, Wi-Fi-offload support, rapid troubleshooting by contextual data utilization, enhanced public safety, security, multiple building automation support, and Self-Organized Network (SON) support. In addition, a multiple application module enabled wireless distribution system can be used for Analytics. Such a system will enable the end user to switch from one application vendor to another without incurring significant switching costs.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A communication system, comprising:
   a wireless distribution system (WDS) configured for transmitting a downlink signal or for receiving an uplink signal; and
   a computing device configured to serve as a client device to the WDS, the computing device comprising:
      a memory;
      a multi applications processor in communication with the memory, the multi applications processor configured to execute one or more applications; and
      a wireless service processor in communication with the multi applications processor for communicating via a corresponding wireless service with the WDS;
      the multi applications processor configured to execute an instance of a data service to establish a connection with the WDS for a specified application process utilizing the wireless service to provide at least one datum on the WDS.

2. The communication system of claim 1, wherein:
   the WDS comprises a head end unit (HEU);
   the client device resides in the HEU; and
   the at least one datum is a quality of service metric on a downlink signal or an uplink signal handled by the HEU.

3. The communication system of claim 2, wherein the client device shares the workload between a group of components consisting of a remote antenna unit (RAU) having at least one RF antenna, a component in the cloud, and a second client device having at least one RF antenna.

4. The communication system of claim 1, wherein:
   the WDS comprises a remote antenna unit (RAU);
   the client device resides in the RAU; and
   the at least one datum is a quality of service metric on a downlink signal or an uplink signal handled by the RAU.

5. The communication system of claim 4, wherein the client device shares the workload between a group of components consisting of the RAU, a component in the cloud, and a second client device.

6. The communication system of claim 1, wherein:
   the WDS comprises a head end unit (HEU);
   the client device resides in the HEU, the client device providing a first client device to the system, the data service of the first client device providing a first data service, the at least one datum providing a first at least one datum, the first at least one datum being a quality of service metric on a downlink signal or an uplink signal handled by the HEU;
   the WDS further comprises a remote antenna unit (RAU);
   a second client device resides in the RAU, the second client device providing a second data service that provides the WDS with a second at least one datum on a transmitted downlink signal or a received uplink signal of the WDS, the second at least one datum being a quality of service metric on the downlink signal or the uplink signal handled by the RAU; and
   the first datum on metrics and the second datum on metrics being correlated to correlate the downlink signal or the uplink signal handled by the HEU to the downlink signal or the uplink signal handled by the RAU.

7. The communication system of claim 1, wherein the WDS comprises a base station, wherein the client device is further configured to scan bands available from the base station and determine a quality of service of a scanned band of frequencies, and the quality of service is the power level of a scanned band of frequencies.

8. The communication system of claim 7, wherein:
   the client device is configured as a first client device;
   the system further comprises a second client device; and
   wherein the first client device is configured to serve as a master to the second client device.

9. The communication system of claim 7, further comprising a server, wherein the client device communicates the at least one datum on the transmitted downlink signal or the received uplink signal of the WDS to the server.

* * * * *